United States Patent [19]
Urakami

[11] Patent Number: 5,536,199
[45] Date of Patent: Jul. 16, 1996

[54] TRAVELING DEVICE

[75] Inventor: Fukashi Urakami, Yokohama, Japan

[73] Assignees: Urakami Research & Development Co., Ltd., Kanagawa; Honda Giken Kogyo Kabushiki Kaisha, Tokyo, both of Japan

[21] Appl. No.: 373,243

[22] PCT Filed: May 27, 1994

[86] PCT No.: PCT/JP94/00841

§ 371 Date: Jan. 18, 1995

§ 102(e) Date: Jan. 18, 1995

[87] PCT Pub. No.: WO94/27856

PCT Pub. Date: Aug. 12, 1994

[30] Foreign Application Priority Data

May 31, 1993 [JP] Japan .................... 5-167257

[51] Int. Cl.⁶ ..................... B24B 55/06
[52] U.S. Cl. ............ 451/91; 451/354; 451/456; 180/164; 15/98
[58] Field of Search .................. 451/439, 354, 451/92, 91, 456; 15/98; 180/164

[56] References Cited

U.S. PATENT DOCUMENTS

| | | | |
|---|---|---|---|
| 4,271,638 | 6/1981 | Creech | 451/439 |
| 4,688,289 | 8/1987 | Urakami | 451/354 |
| 4,809,383 | 3/1989 | Urakami | 451/354 |
| 4,860,400 | 8/1989 | Urakami | 451/354 |
| 4,934,475 | 6/1990 | Urakami | 451/354 |
| 4,997,052 | 3/1991 | Urakami | 451/456 |
| 5,014,803 | 5/1991 | Urakami | 451/456 |
| 5,084,938 | 2/1992 | Khestele | 15/98 |

FOREIGN PATENT DOCUMENTS

| | | |
|---|---|---|
| 63-52980 | 3/1988 | Japan . |
| 3-56948 | 8/1991 | Japan . |
| 3-266781 | 11/1991 | Japan . |

*Primary Examiner*—Bruce M. Kisliuk
*Assistant Examiner*—Andrew Weinberg
*Attorney, Agent, or Firm*—Beveridge, DeGrandi, Weilacher & Young

[57] ABSTRACT

A traveling device having a frame means, and a moving means mounted on the frame means and moving on a travel surface, the moving means comprising a plurality of wheels, or a plurality of endless tracks each including a plurality of belt pulleys is disclosed. The frame means includes a main frame, a pair of oscillating frames arranged on both sides of the main frame, and a connecting frame disposed on one end portion side of the main frame. A central portion of the connecting frame is coupled to the main frame via a mono-axially oscillating joint means, both end portions of the connecting frame are coupled to one end portion of each of the oscillating frames via an omniaxially oscillating joint means, and the other end portion of each of the oscillating frames is coupled to both side portions of the other end portion of the main frame via a biaxially oscillating joint means.

14 Claims, 14 Drawing Sheets

Fig. 9(A)
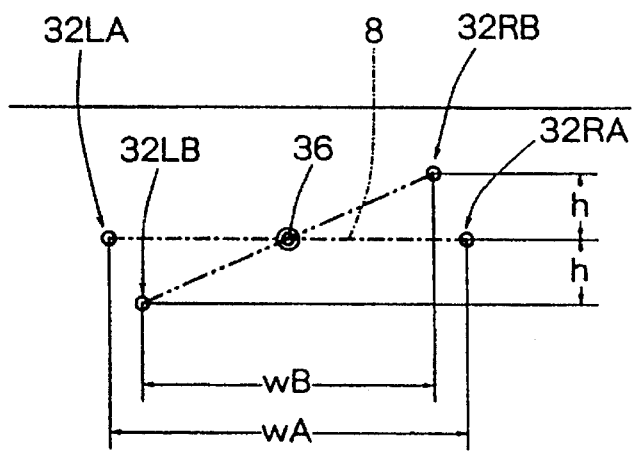
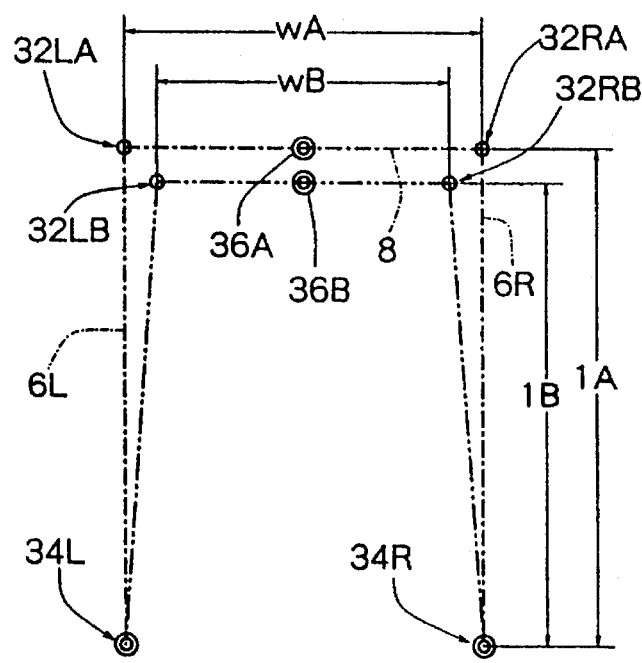
Fig. 9(B)
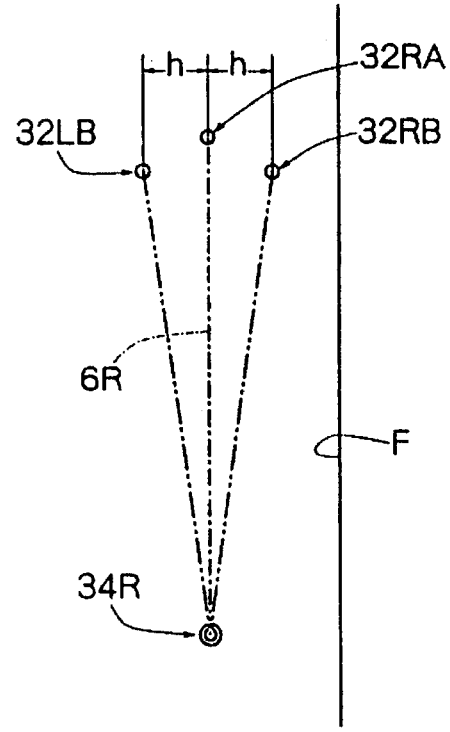
Fig. 9(C)

TRAVELING DEVICE

TECHNICAL FIELD

This invention relates to a traveling device capable of moving on the surface of an object having curved faces (hereinafter referred to as a travel surface), such as the inside or outside surface of a pipe or the surface of a ship hull, by means of a plurality of wheels as moving means, or a plurality of endless tracks, including a plurality of belt pulleys, as moving means, while performing work such as sandblasting.

The invention also relates to a traveling device capable of suction-adhering to a travel surface having curved faces, such as the inside or outside surface of a pipe or the surface of a ship hull, by the pressure of an ambient fluid such as air or water, and capable of moving along the travel surface by means of a plurality of wheels as moving means, or a plurality of endless tracks, including a plurality of belt pulleys, as moving means, while performing work such as sandblasting.

BACKGROUND ART

A typical example of a traveling device capable of suction-adhering to a travel surface having curved faces, such as the inside or outside surface of a pipe or the surface of a ship hull, by the pressure of an ambient fluid such as air or water, and of moving along the travel surface, while performing work such as sandblasting, is the device disclosed in the specification and drawings of U.S. Pat. No. 4,095,378. The device has a pressure reduction housing mounted on a frame, a moving means mounted on the frame, a suction-adhering seal mounted on the pressure reduction housing and defining a pressure reduction space in cooperation with the pressure reduction housing and the travel surface, and a pressure reducing means for discharging a fluid from the pressure reduction space to decrease the pressure inside the pressure reduction space. The moving means is composed of a plurality of wheels (e.g. 4 wheels), or a plurality of endless tracks including a plurality of belt pulleys (e.g. 2 endless tracks each with 2 belt pulleys). The traveling device is equipped with a working unit such as sandblasting equipment which directs a jet of a polishing and cleaning material at the transfer surface.

In the above-described conventional traveling device, when the pressure reducing means is actuated, fluid inside the pressure reduction space is discharged to the outside. Owing to the difference in fluid pressure between the inside and outside of the pressure reduction space, the fluid pressure acts on the pressure reduction housing, and is then transmitted to the travel surface via the wheels or belt pulleys. Under this fluid pressure, the device is caused to suction-adhere to the travel surface. In this state of suction-adhesion, when the wheels or belt pulleys are driven by a driving means such as an electric motor, the device moves along the travel surface by the action of the wheels or endless tracks.

In the foregoing traveling device which suction-adheres to a travel surface having curved faces, such as the inside or outside surface of a pipe or the surface of a ship hull, by the pressure of an ambient fluid, and moves along the travel surface, while performing work such as sandblasting, the frame on which the moving means is mounted has a rigid structure whose shape substantially does not change flexibly. Therefore, in the traveling device equipped with, say, 4 wheels as the moving means, i.e., the traveling device having 2 wheels on each side of the frame, one of the four wheels separates from the travel surface. More specifically, if the device sits on the outside surface of, say, a cylindrical pipe, and if the central axis in the traveling direction of the device is on a plane obliquely intersecting the central axis of the pipe, one of the four wheels departs from the travel surface. Owing to this departure, the posture of the device is always unstable. Not all of the four wheels being in contact with the travel surface results in an insufficient driving force. Such technical problems exist also with a conventional traveling device which moves while performing work such as sandblasting, but which lacks means for suction-adhering to the travel surface by the pressure of an ambient fluid. Furthermore, in the aforementioned traveling device which suction-adheres to a travel surface by the pressure of an ambient fluid, and moves along it, the sealing function of the suction-adhering seal may be hampered, owing to the separation of one of the four wheels from the travel surface. One could easily understand that these problems occur for the same reasons as stated earlier, in connection with the aforementioned traveling device equipped with two endless tracks including a total of 4 belt pulleys as moving means.

In the case of the aforesaid traveling device which suction-adheres to a travel surface by the pressure of an ambient fluid, and moves along it, and which has 4 wheels as the moving means, namely, a traveling device of the type having 2 wheels on each side of the frame, the following phenomenon may arise: During the upward movement of the device on a vertical travel surface such as the wall surface of a ship hull, if a projection extending in a horizontal direction, such as a different-level weld line formed by a laminate of welded steel plates, exists on the travel surface, the device has no sufficient driving force to pass over the projection, with the result that the wheels may rotate at the projection, without imparting a forward movement. Especially when a coating with a small coefficient of friction is present on the travel surface, making the wheels easily slip there, the ascent of the device is impeded at the projection, causing the wheels to run idly. The reason is as follows: In the aforesaid traveling device, the rotating shafts of the four wheels are arranged on the same plane which is at right angles to the traveling direction of the device and which perpendicularly intersects the travel surface. Hence, as the device moves upwards on the vertical travel surface in the vertical direction, 2 of the wheels of the device simultaneously encounter the projection. Thus, the driving force necessary for the device to pass across the projection is twice the driving force required when each one of the four wheels passes over the projection. It will be easily understandable that this problem occurs for the same reason, in regard to the aforementioned traveling device provided with two endless tracks including, say, four belt pulleys, as the moving means. Such a technical problem is also posed with a conventional traveling device which moves while performing work such as sandblasting, but which lacks means for suction-adhering to the travel surface by the pressure of an ambient fluid.

The conventional traveling device, which suction-adheres to the travel surface by the pressure of an ambient fluid and moves along it, may face the following situation: When the device moves while suction-adhering to the travel surface having curved faces, such as the inside and outside surfaces of pipes or those of a ship hull, it may encounter a travel surface having a great curvature in excess of a critical curvature within which travel with suction-adhesion remains possible. In this case, the suction-adhering seal of the device reaches its limit of flexible deformation according to the curvature of the travel surface. This may destroy the sealing function of the suction-adhering seal. Thus, the degree of vacuum of the pressure reduction region of the device may rapidly fall, causing the device to separate from the travel surface abruptly.

DISCLOSURE OF THE INVENTION

An object of the present invention, therefore, is to provide a traveling device which can travel on a travel surface having curved faces with a stable posture, and which has a sufficient driving force.

Another object of the invention is to provide a traveling device which can travel on a travel surface having curved faces with a stable posture, has a sufficient driving force, can suction-adhere to the travel surface by the pressure of an ambient fluid such as air or water, and is able to move along it.

Still another object of the invention is to provide a traveling device which has a sufficient driving force to pass over a projection extending in a horizontal direction, such as a weld line present on a vertical travel surface, can suction-adhere to the travel surface by the pressure of an ambient fluid such as air or water, and is able to move along it.

A further object of the invention is to provide a traveling device which can prevent its separation from the travel surface due to the decline in the sealing function of the suction-adhering sealing means, suction-adhere to the travel surface by the pressure of an ambient fluid such as air or water, and move along it.

Other objects of the invention will become apparent from the following description presented in detail by reference to the appended drawings in connection with embodiments of the traveling device constructed in accordance with the invention.

According to an aspect of the present invention, there is provided a traveling device having a frame means, and a moving means mounted on the frame means and moving on a travel surface, the moving means comprising a plurality of wheels, or a plurality of endless tracks each including a plurality of belt pulleys, wherein the frame means includes a main frame, a pair of oscillating frames arranged on both sides of the main frame, and a connecting frame disposed on one end portion side of the main frame; a central portion of the connecting frame is coupled to the one end portion side of the main frame via a monoaxially oscillating joint means; both end portions of the connecting frame are coupled to one end portion of each of the oscillating frames via an omniaxially oscillating joint means; the other end portion of each of the oscillating frames is coupled to both side portions of the other end portion of the main frame via a biaxially oscillating joint means; each of the biaxially oscillating joint means has an oscillating longitudinal shaft having an oscillating plane substantially parallel to the travel surface, and an oscillating transverse shaft having an oscillating plane substantially perpendicularly intersecting the travel surface; and the monoaxially oscillating joint means has an oscillating transverse shaft having an oscillating plane substantially perpendicularly intersecting the travel surface and also substantially perpendicularly intersecting the oscillating plane of the oscillating transverse shaft of each of the biaxially oscillating joint means.

According to another aspect of the present invention, there is provided a traveling device having a frame means, and a moving means mounted on the frame means and moving on a travel surface, the moving means comprising a plurality of wheels, or a plurality of endless tracks each including a plurality of belt pulleys, wherein the frame means includes a main frame, a pair of oscillating frames arranged on both sides of the main frame, and a connecting frame disposed on one end portion side of the main frame; a central portion of the connecting frame is coupled to the one end portion side of the main frame via a monoaxially oscillating joint means; both end portions of the connecting frame are coupled to one end portion of each of the oscillating frames via an omniaxially oscillating joint means; the other end portion of each of the oscillating frames is coupled to both side portions of the other end portion of the main frame via a monoaxially oscillating joint means; the monoaxially oscillating joint means in each of the oscillating frames has an oscillating transverse shaft having an oscillating plane substantially perpendicularly intersecting the travel surface; and the monoaxially oscillating joint means in the connecting frame has an oscillating transverse shaft having an oscillating plane substantially perpendicularly intersecting the travel surface and also substantially perpendicularly intersecting the oscillating plane of the oscillating transverse shaft of the monoaxially oscillating joint means in each of the oscillating frames.

According to still another aspect of the present invention, there is provided a traveling device having a frame means; a moving means mounted on the frame means and moving on a travel surface, the moving means comprising a plurality of wheels, or a plurality of endless tracks each including a plurality of belt pulleys; a pressure reduction housing mounted on the main frame; a suction-adhering sealing means mounted on the pressure reduction housing and defining a pressure reduction space in cooperation with the pressure reduction housing and the travel surface; and a pressure reducing means for discharging a fluid from the pressure reduction space to the outside; the traveling device being capable of suction-adhering to the travel surface by the pressure of an ambient fluid acting on the pressure reduction housing owing to the difference in fluid pressure between the inside and the outside of the pressure reduction space, and being capable of moving along the travel surface; wherein the frame means includes a main frame, a pair of oscillating frames arranged on both sides of the main frame, and a connecting frame disposed on one end portion side of the main frame; a central portion of the connecting frame is coupled to the one end portion side of the main frame via a monoaxially oscillating joint means; both end portions of the connecting frame are coupled to one end portion of each of the oscillating frames via an omniaxially oscillating joint means; the other end portion of each of the oscillating frames is connected to both side portions of the other end portion of the main frame via a biaxially oscillating joint means; each of the biaxially oscillating joint means has an oscillating longitudinal shaft having an oscillating plane substantially parallel to the travel surface, and an oscillating transverse shaft having an oscillating plane substantially perpendicularly intersecting the travel surface; and the monoaxially oscillating joint means has an oscillating transverse shaft having an oscillating plane substantially perpendicularly intersecting the travel surface and also substantially perpendicularly intersecting the oscillating plane of the oscillating transverse shaft of each of the biaxially oscillating joint means.

According a further aspect of the present invention, there is provided a traveling device having a frame means; a moving means mounted on the frame means and moving on a travel surface, the moving means comprising a plurality of wheels, or a plurality of endless tracks each including a plurality of belt pulleys; a pressure reduction housing mounted on the main frame; a suction-adhering sealing means mounted on the pressure reduction housing and defining a pressure reduction space in cooperation with the pressure reduction housing and the travel surface; and a pressure reducing means for discharging a fluid from the pressure reduction space to the outside; the traveling device being capable of suction-adhering to the travel surface by the pressure of an ambient fluid acting on the pressure reduction housing owing to the difference in fluid pressure between the inside and the outside of the pressure reduction space, and being capable of moving along the travel surface; wherein the rotating shafts of the plural wheels, or the rotating shafts of the plural belt pulleys included in the respective endless tracks, are not arranged on the same plane orthogonal to the direction of travel of the traveling device and perpendicularly intersecting the travel surface, but are arranged on different such planes.

According a still further aspect of the present invention, there is provided a traveling device having a frame means; a moving means mounted on the frame means and moving on a travel surface, the moving means comprising a plurality of wheels, or a plurality of endless tracks each including a plurality of belt pulleys; a pressure reduction housing mounted on the main frame; a suction-adhering sealing means mounted on the pressure reduction housing and defining a pressure reduction space in cooperation with the pressure reduction housing and the travel surface; and a pressure reducing means for discharging a fluid from the pressure reduction space to the outside; the traveling device suction-adhering to the travel surface by the pressure of an ambient fluid acting on the pressure reduction housing owing to the difference in fluid pressure between the inside and the outside of the pressure reduction space, and moving along the travel surface; wherein the device has the pressure reduction housing provided with an annular mounting portion, the suction-adhering sealing means having a space portion toroidal in shape and opened on one end side thereof, and a sealing function compensating means for compensating the sealing function of the suction-adhering sealing means; the space portion of the suction-adhering sealing means is substantially sealed by mounting the one end side of the suction-adhering sealing means on the mounting portion of the pressure reduction housing; and the sealing function compensating equipment has a pressure detecting means for detecting the pressure inside the pressure reduction space, a pressure fluid feeding means for feeding a pressure fluid to the space portion to inflate the suction-adhering sealing means, and a controlling means which, when the degree of vacuum of the pressure reduction space has lowered to less than a predetermined degree of vacuum, actuates the pressure fluid feeding means based on an input signal from the pressure detecting means to feed a pressure fluid to the space portion.

First, the actions of the traveling device constructed according to one aspect of the present invention will be described. For convenience of explanation, an explanation will be offered for the actions of the traveling device having 2 wheels mounted on each of a pair of oscillating frames as a moving means. In this device, a central portion of a connecting frame and one end portion side of a main frame are coupled by a monoaxially oscillating joint means, both end portions of the connecting frame and one end portion of each oscillating frame are coupled by an omniaxial joint means, and the other end portion of each oscillating frame is coupled to both side portions on the other end portion side of the main frame via a biaxially oscillating joint means. If the device lies on the outside surface of, say, a cylindrical pipe, and if the central axis in the traveling direction of the device is on a plane obliquely intersecting the central axis of the pipe, the pair of oscillating frames oscillate with respect to the main frame, and the connecting frame pivots about the main frame, so that the frames as a whole deform following the travel surface. As a result, the four wheels all contact the travel surface. Thus, this device can travel on the travel surface with a stable posture and show a sufficient driving force. On such traveling device is generally mounted working equipment such as a sandblaster for directing a jet of an abrasive material at the travel surface. When the traveling device is equipped with, say, a sandblaster, it can reliably perform sandblasting on the travel surface having curved faces, similarly to a flat travel surface.

When the entire frame deforms, the relative positions of the main frame and each oscillating frame change freely with each biaxially oscillating joint means as the center of revolution. Also, the relative positions of the main frame and the connecting frame change freely with the oscillating transverse shaft of the monoaxially oscillating joint means as the center of revolution. The contents of these changes in the relative positions will be described in greater detail. On the plane perpendicularly intersecting the oscillating transverse shaft of each of the biaxially oscillating joint means, the relative angles of the main frame to each of the oscillating frames vary. Also on the plane perpendicularly intersecting the oscillating longitudinal shaft of each of the biaxially oscillating joint means, the relative angles of the main frame to each of the oscillating frames vary. However, the relative angles of the main frame to each of the oscillating frames do not vary on the plane bearing each oscillating transverse shaft and perpendicularly intersecting the travel surface. On the other hand, the relative angle between the main frame and the connecting frame varies on the plane perpendicularly intersecting the oscillating transverse shaft of the monoaxially oscillating joint means. The above-described relative changes in the positions of the connecting frame and each oscillating frame with respect to the main frame can be made by the omniaxially oscillating joint means connecting both end portions of the connecting frame to the one end portion of each oscillating frame.

As the relative angle between the main frame and the oscillating frame on the plane perpendicularly intersecting the oscillating transverse shaft (this angle is 0 degree on the flat travel surface) becomes larger, the relative angle between the connecting frame and the main frame (0 degree on the flat travel surface) also increases. Thus, that distance between one end portion and the other end portion of the connecting frame which is on the plane perpendicularly intersecting the oscillating longitudinal shaft of each biaxially oscillating joint means becomes smaller. Consequently, the relative angle between the main frame and the oscillating frame on the plane perpendicularly intersecting each oscillating longitudinal shaft (this angle is 90 degrees on the flat travel surface) becomes smaller than 90 degrees. On this occasion, that distance between the central portion of the connecting frame and the oscillating transverse shaft of each biaxially oscillating joint means which is on the plane perpendicularly intersecting the oscillating longitudinal shaft of each biaxially oscillating joint means is reduced. As a result, a force heading for the main frame on the oscillating transverse shaft of the monoaxially oscillating joint means acts on the central portion of the connecting frame. To absorb this force, the connecting frame is preferably constructed so as to be slidable along the oscillating transverse shaft of the monoaxially oscillating joint means. This construction permits a smooth deformation without deflection occurring in the pair of oscillating frames and without a strain acting on the frames as a whole. If the connecting frame cannot slide toward the main frame along the oscillating transverse shaft of the monoaxially oscillating joint means, the structure or material of the connecting frame needs to be specified so that the connecting frame can deflect toward the main frame. As an example, the connecting frame may be composed of a steel plate shaped like a belt. If the connecting frame can neither slide along the oscillating transverse shaft of the monoaxially oscillating joint means nor defect toward the main frame, the omniaxial joint means connecting both end portions of the connecting frame to one end portion of each oscillating frame needs to be mounted so as to be movable toward the main frame.

In the above-mentioned traveling device, 2 wheels are mounted on each of the pair of oscillating frames as a moving means, but it is possible to mount one wheel on each of the pair of oscillating frames and two wheels on the main frame. The total number of the wheels to be mounted on the device is not restricted as long as it is 4 or more. Nor is there any restriction on the place where the wheels are mounted. As the moving means, there may be mounted an endless track on each of the pair of oscillating frames. The total number of the endless tracks to be mounted on the device is not restricted as long as it is 2 or more. Nor is there any restriction on the place where the endless tracks are mounted. If, for example, two endless tracks each including two belt pulleys are mounted as moving means, a total of 4 belt pulleys are grounded on the travel surface. The mounting of the wheels or endless tracks on each oscillating frame improves the stability of travel.

Next, the actions of the traveling device constructed according to another aspect of the present invention will be described. For convenience of explanation, an explanation will be offered for the actions of the traveling device having 2 wheels mounted on each of a pair of oscillating frames as a moving means. In this device, a central portion of a connecting frame and one end portion side of a main frame are coupled by a monoaxially oscillating joint means, both end portions of the connecting frame and one end portion of each oscillating frame are coupled by an omniaxial joint means, and the other end portion of each oscillating frame is connected to both side portions on the other end portion side of the main frame via a monoaxially oscillating joint means. If the device lies on the outside surface of, say, a cylindrical pipe, and if the central axis in the traveling direction of the device is on a plane obliquely intersecting the central axis of the pipe, the pair of oscillating frames oscillate with respect to the main frame, and the connecting frame pivots about the main frame, so that the frames as a whole deform following the travel surface. As a result, the four wheels all contact the travel surface. Thus, this device can also travel on the travel surface with a stable posture and show a sufficient driving force. When the traveling device is equipped with, say, a sandblaster, it can reliably perform sandblasting on the travel surface having curved faces, similarly to a flat travel surface.

When the entire frame deforms, the relative positions of the main frame and each oscillating frame change freely with the oscillating transverse shaft of each monoaxially oscillating joint means as the center of revolution. Also, the relative positions of the main frame and the connecting frame change freely, with the oscillating transverse shaft of the monoaxially oscillating joint means, which connects these frames together, as the center of revolution. The contents of these changes in the relative positions will be described in greater detail. On the plane perpendicularly intersecting the oscillating transverse shaft of each of the monoaxially oscillating joint means connecting the main frame and each oscillating frame, the relative angles of the main frame to each of the oscillating frames vary. Also on the plane parallel to the travel surface, the relative angles of the main frame to each of the oscillating frames vary. In this case, stress occurring at each junction of each oscillating frame owing to oscillations is absorbed by the deflection of the mounting portion for the oscillating transverse shaft in each of the monoaxially oscillating joint means connecting together the main frame and each oscillating frame, or by the deflection of each oscillating frame. Thus, it becomes possible for each oscillating frame to deflect on the plane parallel to the travel surface, thereby permitting the oscillation of each oscillating frame. When each oscillating frame is to be deflected in a direction heading for the main frame, its structure or material needs to be defined so as to permit its deflection in this direction. As an example, the oscillating frame may be constructed of a sheet plate shaped like a belt. The device with such a construction is applied when the angle of oscillation is relatively small, namely, when the curvature of the curved surface is relatively small. The actions of the other parts are substantially the same as those for the traveling device constructed in accordance with the first aspect of the present invention.

When the relative angle of each oscillating frame to the main frame on the plane parallel to the travel surface varies, a force heading for the main frame on the oscillating transverse shaft of the monoaxially oscillating joint means acts on the central portion of the connecting frame. To absorb this force, the connecting frame is preferably adapted to be slidable along the oscillating transverse shaft of the monoaxially oscillating joint means. If the connecting frame cannot slide toward the main frame along the oscillating transverse shaft of the monoaxially oscillating joint means, the structure or material of the connecting frame needs to be specified so that the connecting frame can deflect toward the main frame. An example of such a structure is as stated previously. The structure, mounting position, and actions of the moving means in the traveling device are the same as those in the aforementioned traveling device.

Next, the actions of the traveling device constructed according to still another aspect of the present invention will be described. For convenience of explanation, an explanation will be offered for the actions of the traveling device having 2 wheels mounted on each of a pair of oscillating frames as a moving means. This device has a pressure reduction housing mounted on a main frame, a suction-adhering sealing means mounted on the pressure reduction housing and defining a pressure reduction space in cooperation with the pressure reduction housing and the travel surface, and a pressure reducing means for discharging a fluid from the pressure reduction space to the outside; and the device is adapted to suction-adhere to the travel surface by the pressure of an ambient fluid acting on the pressure reduction housing owing to the difference in fluid pressure between the inside and the outside of the pressure reduction space, and to move along the travel surface. This device has the same structure for frame means as in the traveling device constructed in accordance with the first aspect of the invention. That is, the central portion of the connecting frame and one end portion side of the main frame are coupled by a monoaxially oscillating joint means, both end portions of the connecting frame and one end portion of each oscillating frame are coupled by an omniaxial joint means, and the other end portion of each oscillating frame is coupled to both side portions on the other end portion side of the main frame via a biaxially oscillating joint means.

In the device constructed as above, when the pressure reducing means is actuated, a fluid within the pressure reduction space, such as air, is expelled to the outside of the pressure reduction housing, thereby reducing the pressure in the pressure reduction space. When the pressure reduction space is reduced in pressure, the pressure of an ambient fluid, such as the air, which acts on the pressure reduction housing owing to the difference in fluid pressure between the inside and the outside of the pressure reduction space is transmitted to the travel surface via the 4 wheels. As a result, the device is caused to suction-adhere to the travel surface by the pressure of the ambient fluid. When, in this state of suction-adhesion, the 4 wheels are rotationally driven by a suitable driving means such as an electric motor, the device is moved along the travel surface as suction-adhered thereto. Its frame means is constructed as aforementioned, so that even if the device lies on the travel surface having a curved face, the four wheels are all grounded on the travel surface. Thus, this device can travel on the travel surface having a curved face with a stable posture and show a sufficient driving force. When the traveling device is equipped with, say, a sandblaster, it can reliably perform sandblasting on the travel surface having curved faces, similarly to a flat travel surface. Moreover, the device can prevent foreign matter, peeled off the travel surface during sandblasting, and the abrasive material from scattering to the outside of the device and polluting the environment. The structure, mounting position, and actions of the moving means in the traveling device are the same as those in the aforementioned traveling device.

Next, the actions of the traveling device constructed according to a further aspect of the present invention will be described. For convenience of explanation, an explanation will be offered for the actions of the traveling device having 2 wheels mounted on each of a pair of oscillating frames as a moving means. This device has a pressure reduction housing mounted on a main frame, a suction-adhering sealing means mounted on the pressure reduction housing and defining a pressure reduction space in cooperation with the pressure reduction housing and the travel surface, and a pressure reducing means for discharging a fluid from the pressure reduction space to the outside; and the device is adapted to suction-adhere to the travel surface by the pressure of an ambient fluid acting on the pressure reduction housing owing to the difference in fluid pressure between the inside and the outside of the pressure reduction space, and to move along the travel surface. In this device, moreover, the respective rotating shafts of the four wheels are not arranged on the same plane orthogonal to the direction of travel of the traveling device and perpendicularly intersecting the travel surface, but they are arranged on different planes.

The actions of the device constructed as above and moving along the travel surface as suction-adhered thereto are performed in the same manner as stated previously. The respective rotating shafts of the four wheels are arranged as aforementioned, so that when the device is to move upwards while passing over a horizontally extending projection, such as a weld line, present on a vertical travel surface, the four wheels pass over the projection one after another. As a result, the device can exhibit a sufficient driving force, despite the presence of a part resisting its travel. When the traveling device is equipped with, say, a sandblaster, it can reliably perform sandblasting, as on a flat travel surface. Moreover, the device can prevent foreign matter, peeled off the travel surface during sandblasting, and the abrasive material from scattering to the outside of the device and polluting the environment. The structure, mounting position, and actions of the moving means in the traveling device are the same as those in the aforementioned traveling device. When two endless tracks each including two belt pulleys, for example, are mounted as a moving means, the four belt pulleys pass over the projection one after another and move upwards.

Next, the actions of the traveling device constructed according to a still further aspect of the present invention will be described. For convenience of explanation, an explanation will be offered for the actions of the traveling device having 2 wheels mounted on each of a pair of oscillating frames as a moving means. This device has a pressure reduction housing mounted on a main frame, a suction-adhering sealing means mounted on the pressure reduction housing and defining a pressure reduction space in cooperation with the pressure reduction housing and the travel surface, and a pressure reducing means for discharging a fluid from the pressure reduction space to the outside; and the device is adapted to suction-adhere to the travel surface by the pressure of an ambient fluid acting on the pressure reduction housing owing to the difference in fluid pressure between the inside and the outside of the pressure reduction space, and to move along the travel surface. The device also has the pressure reduction housing provided with an annular mounting portion, the suction-adhering sealing means having a space portion toroidal in shape and opened at one end side thereof, and a sealing function compensating means for compensating the sealing function of the suction-adhering sealing means. The space portion of the suction-adhering sealing means is substantially sealed by mounting the one end side of the suction-adhering sealing means on the mounting portion of the pressure reduction housing. The sealing function compensating equipment has a pressure detecting means for detecting the pressure inside the pressure reduction space, a pressure fluid feeding means for feeding a pressure fluid to the space portion to inflate the suction-adhering sealing means, and a controlling means which, when the degree of vacuum of the pressure reduction space has lowered to less than a predetermined degree of vacuum, actuates the pressure fluid feeding means based on an input signal from the pressure detecting means to feed a pressure fluid to the space portion.

The actions of the device constructed as above and moving along the travel surface as suction-adhered thereto are performed in the same manner as stated previously. If the device encounters the travel surface having a large curvature exceeding a critical curvature within which travel under suction-adhesion remains possible, the suction-adhering sealing means of the device reaches its limit of flexible deformation according to the curvature of the travel surface. This leads to destroying the sealing function of the suction-adhering sealing means. Thus, the degree of vacuum of the pressure reduction region of the device may rapidly fall, causing the device to separate from the travel surface abruptly. The aforementioned sealing function compensating equipment prevents such an unfavorable phenomenon. That is, when the degree of vacuum of the pressure reduction space has lowered to less than a predetermined degree of vacuum, the pressure detecting means, such as a pressure sensor, detects this fact. Based on an input signal from the pressure sensor telling that the degree of vacuum of the pressure reduction space has lowered to less than the predetermined degree of vacuum, the controlling means, e.g. a microcomputer, puts out a control signal for actuating the pressure fluid feeding means. According to this signal, the pressure fluid feeding means is actuated to feed the pressure fluid to the space portion of the suction-adhering sealing means.

The pressure fluid feeding means is constructed of a compressor for generating compressed air as a pressure fluid, and a pressure reducing valve and an electromagnetic opening/closing valve disposed on an air flow path connecting the compressor to the space portion of the suction-adhering sealing means. When closed for a non-operating state, the electromagnetic opening/closing valve closes the air flow path on the compressor side, and opens the air flow path on the space portion side of the suction-adhering sealing means to the air. When opened for an operating state, this valve opens the air flow path on the compressor side, causing the compressor and the space portion to communicate with each other, and closes the air flow path on the open-air side. A control signal from the microcomputer is put out to the electromagnetic opening/closing value. Once the electromagnetic opening/closing value opens, the suction-adhering sealing means is inflated, whereby a free end portion of the suction-adhering sealing means is moved toward the travel surface. Accordingly, the suction-adhering sealing means is made to fit the curvature of the travel surface, so that the destruction of its sealing function is prevented. Consequently, despite the above-mentioned curvature of the travel surface, the device can move reliably along the travel surface while suction-adhering thereto, without separating from this surface. When the traveling device is equipped with, say, a sandblaster, it can reliably perform sandblasting, as on a flat travel surface. Moreover, the device can prevent foreign matter, peeled off the travel surface during sandblasting, and the abrasive material from scattering to the outside of the device and polluting the environment. The structure and mounting position of the moving means in the traveling device are the same as those in the aforementioned traveling device.

BRIEF DESCRIPTION OF THE DRAWINGS

FIG. 9 is a schematic representation of how the entire shape of the frames of the device illustrated in FIG. 1 changes on a curved travel surface, including an upper side view, a plan view, and a right side view of the device.

BEST MODE FOR CARRYING OUT THE INVENTION

The traveling device improved in accordance with the present invention will be described in detail hereinbelow by reference to the appended drawings based on embodiments of the traveling device capable of suction-adhering to the travel surface by the pressure of an ambient fluid such as air or water, and of moving along it.

Figure 1:
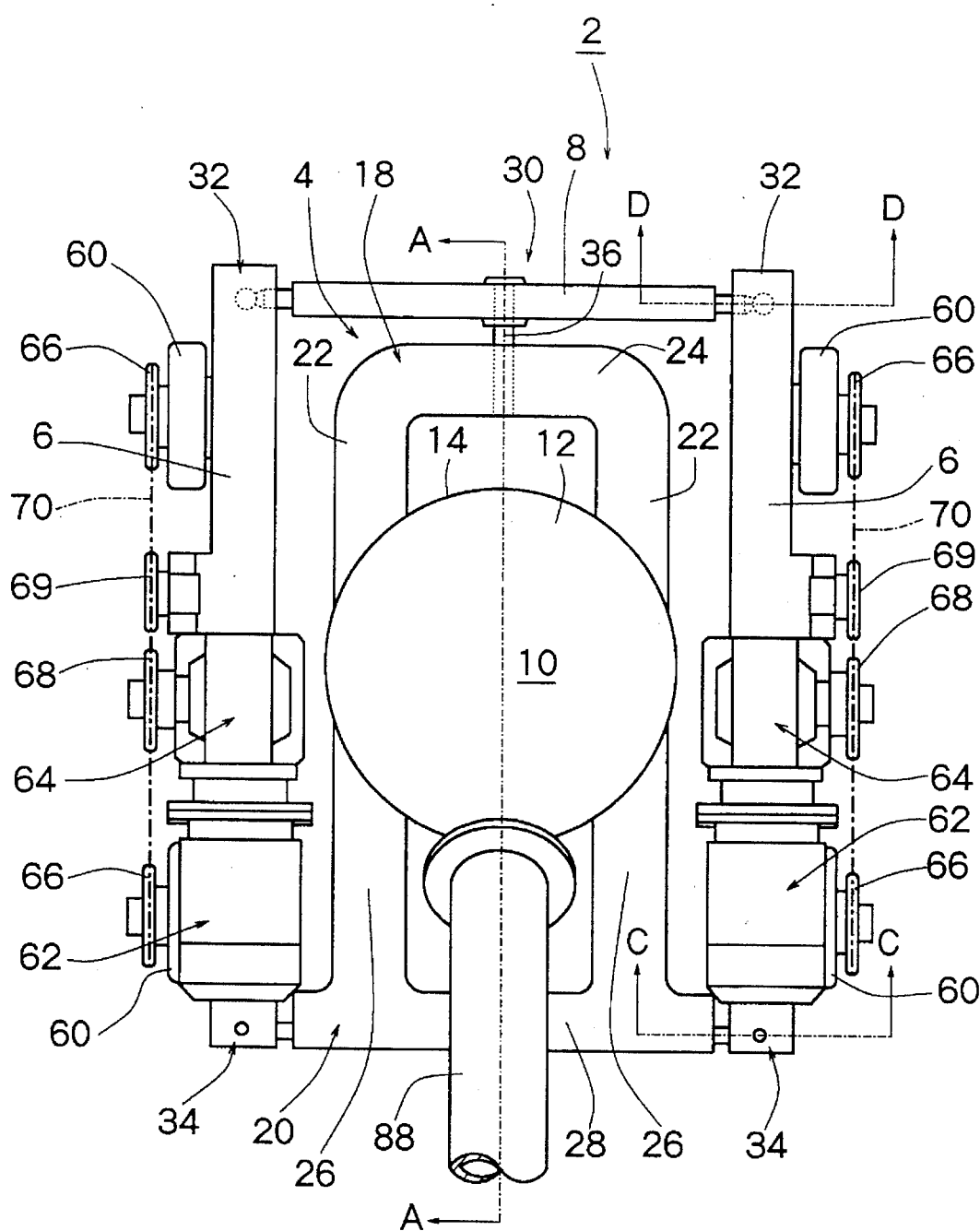
FIG. 1 is a plan view showing an embodiment of a traveling device constructed in accordance with the present invention.
Figure 2:
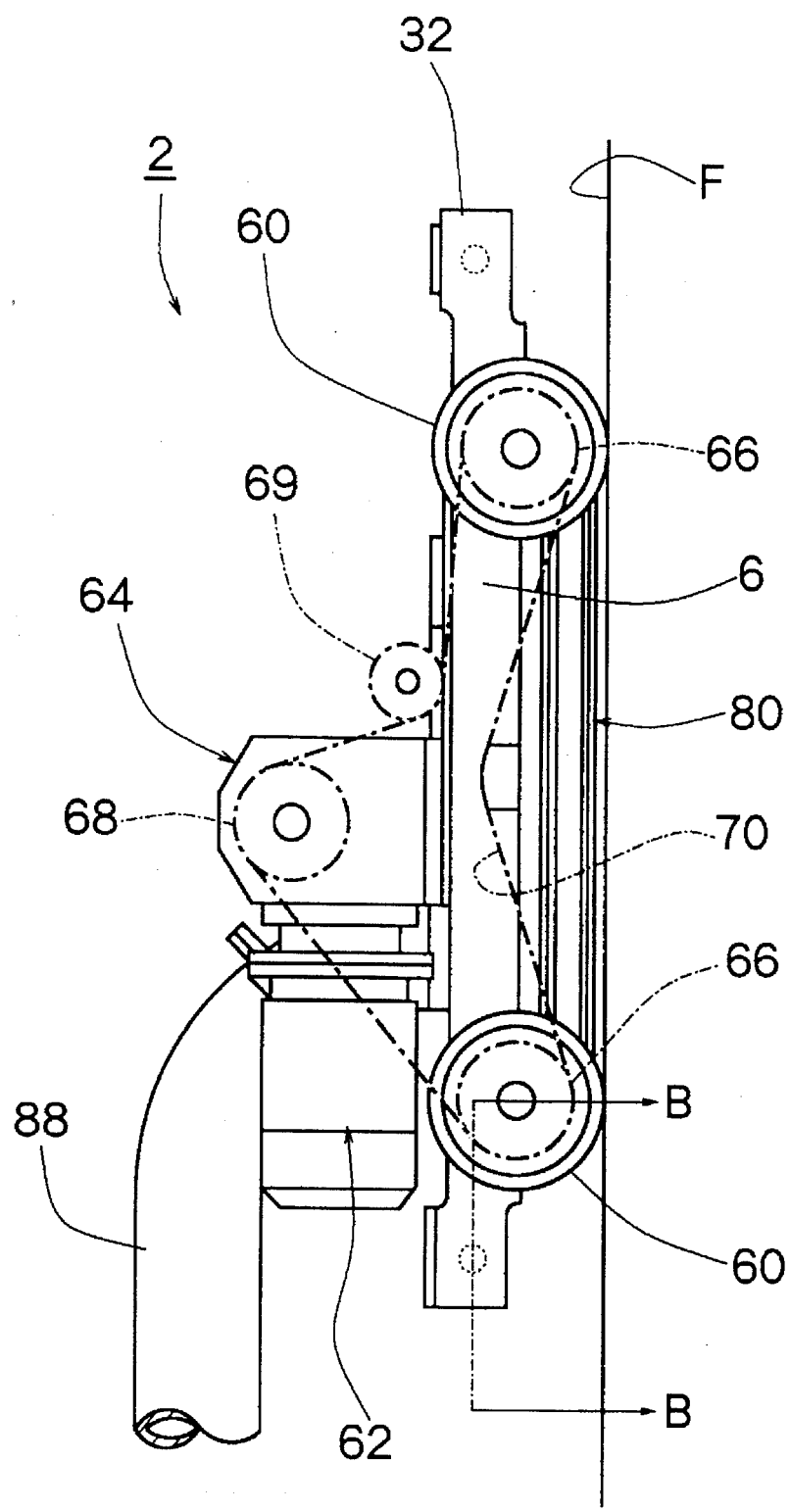
FIG. 2 is a right side view of FIG. 1.
Figure 3:
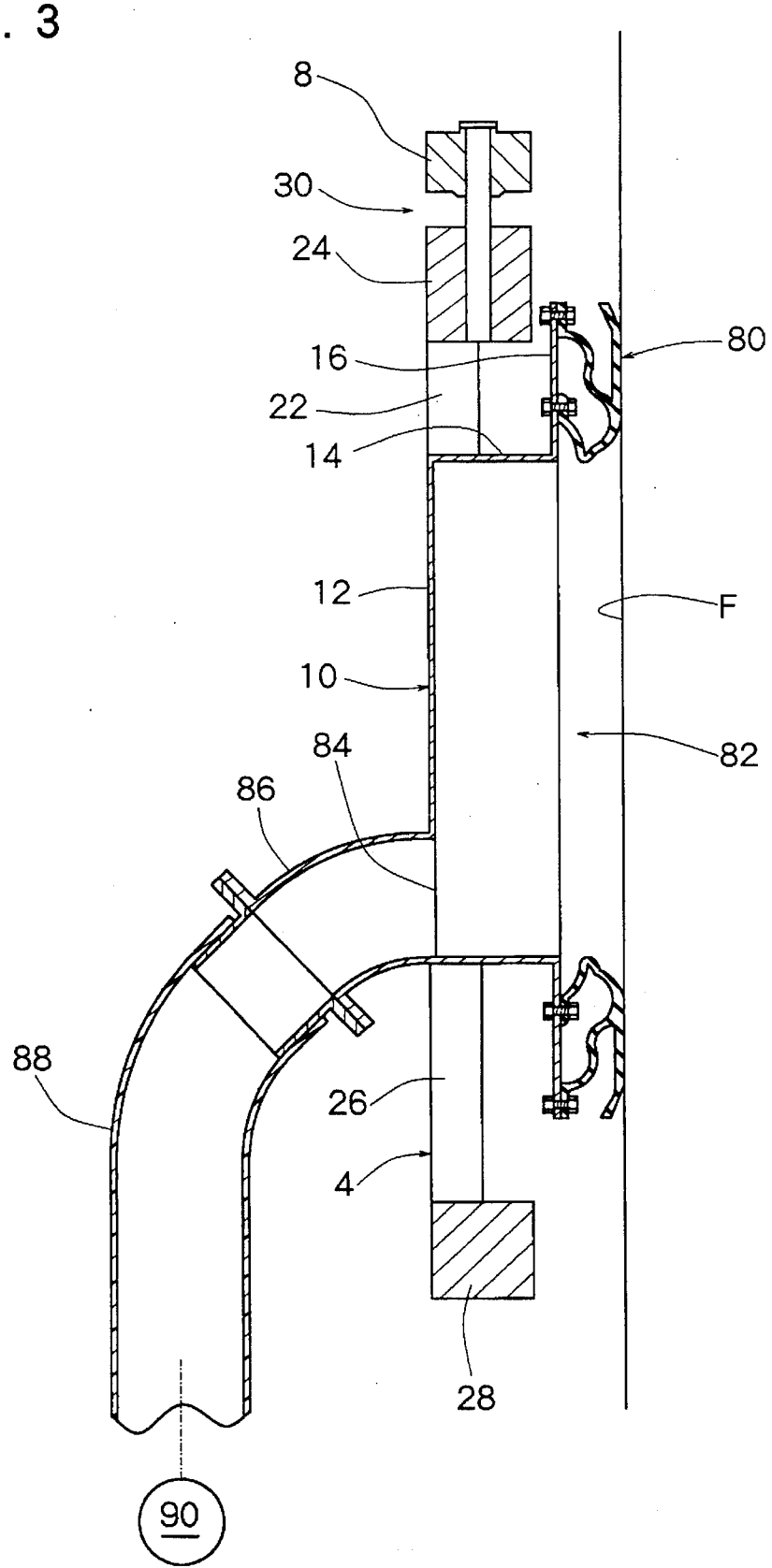
FIG. 3 is a sectional view taken on line A—A of FIG. 1.
Figure 4:
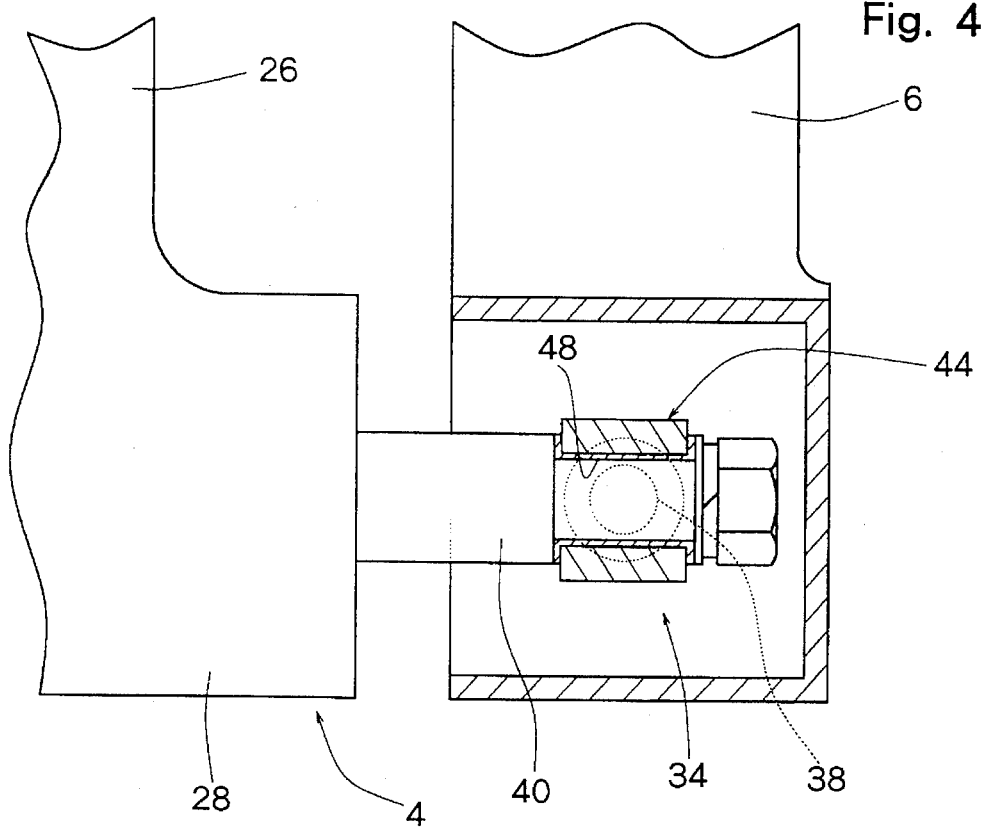
FIG. 4 is a sectional view taken on line B—B of FIG. 2.
Figure 5:
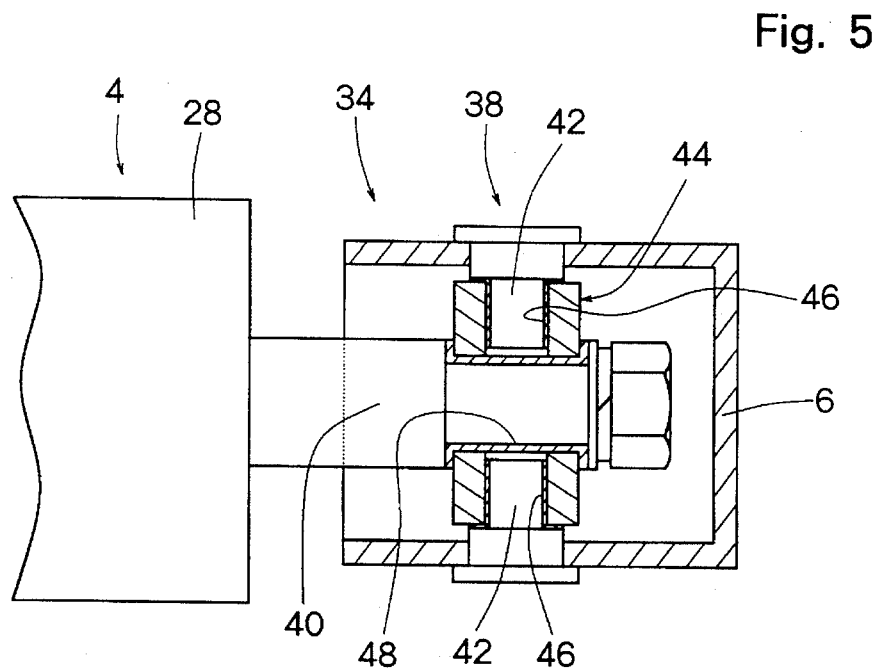
FIG. 5 is a sectional view taken on line C—C of FIG. 1.

With reference to FIGS. 1 to 3, a traveling device shown entirely at the numeral 2 includes a main frame 4, a pair of oscillating frames 6 disposed on both sides of the main frame (right and left side portions of FIG. 1), and a connecting frame 8 disposed on one end side of the main frame 4 (upper end side of FIG. 1). At a central portion of the main frame 4 is disposed a pressure reduction housing 10 formed of a rigid material which advantageously is a suitable metal plate such as a stainless steel plate. The pressure reduction housing 10 has a circular top wall 12, a cylindrical side wall 14 extending from the peripheral edge of the top wall 12, and a torus-like flange wall 16 extending from the front end of the side wall 14. A structure related to the pressure reduction housing 10 will be described later. On the outside of the pressure reduction housing 10, i.e., the outside of the side wall 14 are fixed a housing frame 18 located above the side wall 14 in FIG. 1, and a housing frame 20 located below the side wall 14 in FIG. 1. The housing frame 18 has extensions 22 extending parallel to each other and upwardly of the side wall 14 at a distance in the right-and-left direction in FIG. 1, and a connecting portion 24 extending between these extensions 22. The housing frame 20 has extensions 26 extending parallel to each other and downwardly of the side wall 14 at a distance in the right-and-left direction in FIG. 1, and an end portion 28 extending between these extensions 26. In this embodiment, therefore, the main frame 4 is composed of the housing frames 18 and 20, and the pressure reduction housing 10 is mounted on each of these housing frames 18 and 20. This means that the pressure reduction housing 10 constitutes a part of the main frame 4. The main frame 4, the pair of oscillating frames 6, and the connecting frame 8 thus make up the frame means.

A central portion of the connecting frame 8 (central portion in the right-and-left direction of FIG. 1) is coupled to one end portion side of the main frame 4, i.e., to the central portion of the connecting portion 24 via a monoaxially oscillating joint means 30. Both end portions of the connecting frame 8 are coupled to one end portion of each oscillating frame 6 (upper end portion of FIG. 1) via an omniaxially oscillating joint means 32. The other end portion of each oscillating from 6 (lower end portion in FIG. 1) is coupled to both side portions of the other end portion of the main frame 4, i.e., to both side portions of the end portion 28 via a biaxially oscillating joint means 34. The monoaxially oscillating joint means 30 has one oscillating transverse shaft 36. An end of the oscillating transverse shaft 36 is fixed to the connecting portion 24, and the other end portion thereof protrudes upwards from the connecting portion 24 in FIG. 1. The central portion of the connecting frame 8 is coupled to the oscillating transverse shaft 36 so as to be free to pivot and to slide along the oscillating transverse shaft 36. The oscillating transverse shaft 36 has an oscillating plane which substantially perpendicularly intersects the travel surface and substantially perpendicularly intersects the oscillating plane of an oscillating transverse shaft 40 (to be described) of each biaxially oscillating joint means 34.

The respective biaxially oscillating joint means 34 are substantially of the same construction, and one of them will be described here. With reference to FIGS. 1, 2, 4 and 5, the biaxially oscillating joint means 34 has an oscillating longitudinal shaft 38 having an oscillating plane substantially parallel to the travel surface F, and one oscillating transverse shaft 40 having an oscillating plane substantially perpendicularly intersecting the travel surface F. In further detail, a box-shaped hollow portion opening toward the end portion 28 of the main frame 4 is formed at the other end portion of the oscillating frame 6, and two pins 42 are fixed so as to protrude into the hollow portion. The pins 42 are each positioned coaxially, and the oscillating longitudinal shaft 38 is composed of each pin 42. The front end portions of the pins 42 are coupled rotatably via oilless bearings 46 to the inside of two bearing portions disposed coaxially in a cruciform bearing member 44. As a result, the cruciform bearing member 44 is rotatably held in the oscillating frame 6 by means of each pin 42. One end of the oscillating transverse shaft 40 is fixed to the end portion 28 of the main frame 4, and at its front end protruding sideways from the end portion 28 is rotatably held the cruciform bearing member 44 via the oilless bearing 48. Therefore, the other end portion of the oscillating frame 6 is coupled so as to be rotatable, with respect to the end portion 28 of the main frame 4, about the oscillating transverse shaft 40 as well as about each pin 42 constituting the oscillating longitudinal shaft 38.

Figure 6:
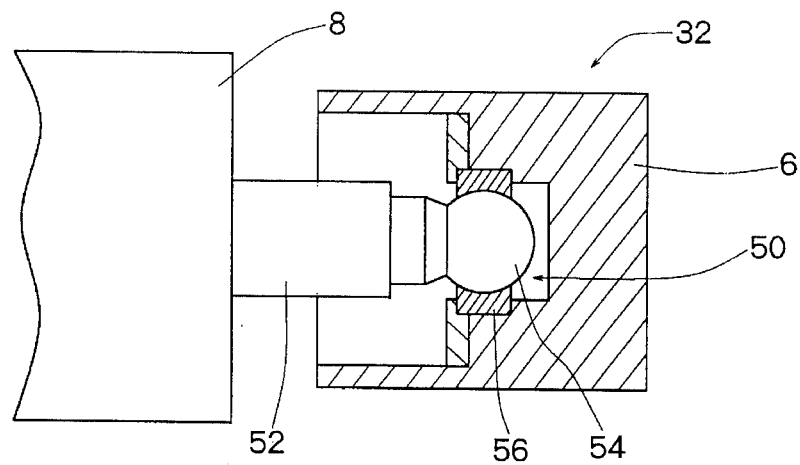
FIG. 6 is a sectional view taken on line D—D of FIG. 1.

The aforementioned omniaxially oscillating joint means 32 have substantially the same constitution, and so only one of them will be described. With reference to FIG. 6, the omniaxially oscillating joint means 32 is composed of a spherical joint 50, and the spherical joint 50 is composed of a sphere 54 formed at a front end portion of a transverse shaft 52 having one end portion fixed to an end portion of the connecting frame 8, and a spherical bearing member 56 mounted on one end portion side of the oscillating frame 6. On the one end portion side of the oscillating frame 6 is formed a concavity opening toward the connecting frame 8, and the spherical bearing member 56 is mounted in the concavity. The sphere 54 of the transverse shaft 52 is held by the spherical bearing member 56 so as to be rotatable in all directions. Thus, the end portion of the connecting frame 8 and the one end portion of the oscillating frame 6 are coupled via the spherical joint 50 so as to be capable of omnidirectional relative rotations.

With reference to FIGS. 1 and 2, the oscillating frame 6 located on the right-hand side of FIG. 1 has mounted therein two wheels 60 constituting the moving means, a geared motor 62 which is an electric motor constituting a rotary drive source, and a reduction gear mechanism 64. Each wheel 60 is fixed to an axle rotatably supported on the oscillating frame 6, and a sprocket 66 is further fixed to each axle. The output shaft of the geared motor 62 is coupled to the input shaft of the reduction gear mechanism 64, and a sprocket 68 is fixed to the output shaft of the reduction gear mechanism 64. A tension sprocket 69 is also rotatably supported on the oscillating frame 6. An endless roller chain 70 is wound over the sprockets 66, 68 and 69. When the geared motor 62 is energized (actuated), therefore, each wheel 60 is rotationally driven. On the oscillating frame 6 located on the left-hand side of FIG. 1 are also mounted a moving means and a driving means for driving the moving means. However, their constitution and actions are substantially the same as in the above-mentioned device, so that the same numerals will be assigned to the same parts, and explanations for them will be omitted. If desired, an endless track including, say, two belt pulleys may be used instead of the wheels 60.

A further explanation will be offered by reference to FIGS. 1 to 3. On the torus-like flange wall 16 of the reduction pressure housing 10 is mounted a suction-adhering sealing means 80. The suction-adhering sealing means 14 is brought into contact with the travel surface 4, and a substantially tight pressure reduction space 82 is defined by the pressure reduction housing 10, the suction-adhering sealing means 80; and the travel surface 4. The constitution of the suction-adhering sealing means 80 itself will be described later. In the top wall 12 of the pressure reduction housing 10 is formed an opening 84, which is connected to a connecting pipe 86. The connecting pipe 86 is connected to a pressure reducing means 90 via a flexible suction hose 88. The pressure reducing means 90 may be comprised of a suitable evacuating means such as a vacuum pump or an ejector. When the device 2 is to be used in a liquid such as water, the evacuating means may be composed of a drainage pump. Thus, when the pressure reducing means 90 is actuated, a fluid inside the pressure reduction space 82, such as the air, is discharged to the outside through the suction hose 88, whereby the reduction pressure space 82 is reduced in pressure, and the device 2 is caused to suction-adhere to the travel surface F.

Figure 18:
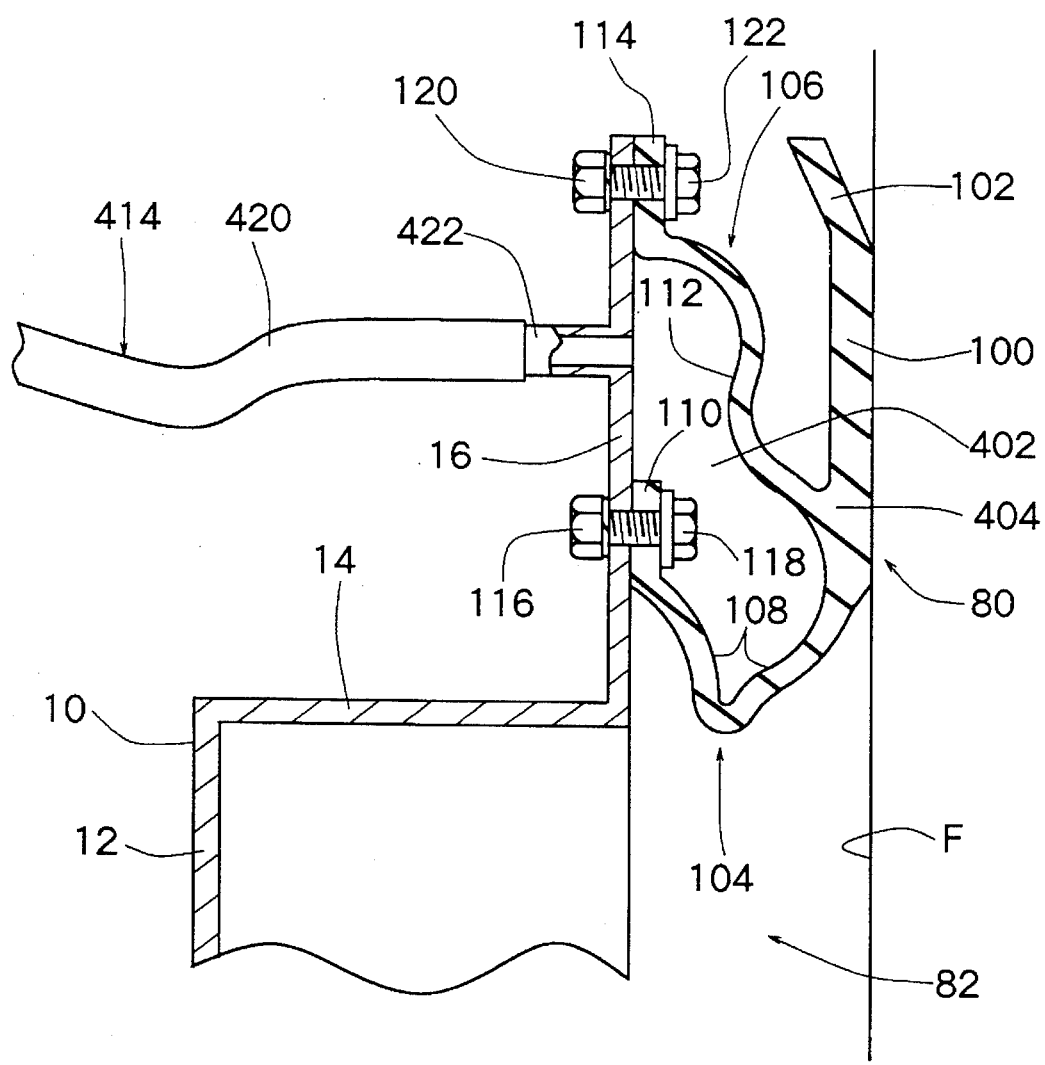
FIG. 18 is an enlarged section view of the A portion of FIG. 17.

In referring to FIG. 18 along with FIGS. 1 to 3, the suction-adhering sealing means 80 is mounted on the torus-like flange wall 16 of the pressure reduction housing 10, as described previously. The flange wall 16 makes up the annular mounting portion of the pressure reduction housing 10. The suction-adhering sealing means 80 is integrally formed of a flexible material, and has an extension 102, an inside connecting portion 104, and an outside connecting portion 106 as well as a lip portion 100, a portion for grounding to the travel surface F. An example of a suitable material for forming the suction-adhering sealing means 80 is synthetic rubber such as urethane rubber. The lip portion 100 in the shape of a torus is allowed to extend substantially parallel to the flange wall 16 in the pressure reduction housing 10 (accordingly, when the travel surface F to which the device 2 is caused to suction-adhere is substantially flat, the lip portion 100 extends substantially in a planar form along the travel surface F). The extension 102 extending from the front end of the lip portion 100 is allowed to extend obliquely in a direction away from the travel surface F. The inside connecting portion 104 that connects the inner peripheral edge portion of the lip portion 100 to the flange wall 16 of the pressure reduction housing 10 has a deflecting portion 108 which, in the cross-sectional view, extends nearly arcuately from the inner peripheral edge portion of the lip portion 100 in a radially inward direction and then extends nearly arcuately in a radially outward direction, and a flange portion 110 which further extends substantially linearly from the deflecting portion 108 along the flange wall 16 of the pressure reduction housing 10 in a radially outward direction. The outside connecting portion 106 that radially outwardly of the inside connecting portion 104 connects the inner peripheral edge portion of the lip portion 100 to the flange wall 16 of the pressure reduction housing 10 has a deflecting portion 112 which, in the cross-sectional view, extends nearly sigmoidally from the inner peripheral edge portion of the lip portion 100 in a radially outward direction, and a flange portion 114 which further extends substantially linearly from the deflecting portion 112 along the flange wall 16 of the pressure reduction housing 10 in a radially outward direction.

As will be seen from FIG. 18, the flange portion 110 of the inside connecting portion 104 is coupled to the flange wall 16 of the pressure reduction housing 10 by means of bolts 116 and nuts 118 at many positions spaced at intervals in the circumferential direction. Likewise, the flange portion 114 of the outside connecting portion 106 is coupled to the flange wall 16 of the pressure reduction housing 10 by means of bolts 120 and nuts 122 at many positions spaced at intervals in the circumferential direction. This way, the suction-adhering sealing means 80 is mounted on one surface of the flange wall 16 of the pressure reduction housing 10. The lip portion 100 of the suction-adhering sealing means 80 can be displaced by a relatively small force coming toward and going away from the travel surface F (in the right-and-left direction in FIG. 18) to which the device 2 is allowed to suction-adhere, because of the elastic deformation of the deflecting portion 108 of the inside connecting portion 104 and the deflecting portion 112 of the outside connecting portion 106. As will be understood from FIG. 3 together with FIG. 18, the pressure reduction space 82 is defined by the inside connecting portion 104 of the suction-adhering sealing means 80 in cooperation with the pressure reduction housing 10 and the travel surface F.

As noted above, when the pressure reducing means 90 is actuated, a fluid inside the pressure reduction space 82, such as the air, is discharged to the outside through the suction hose 88, and the pressure reduction space 82 is reduced in pressure. Once the pressure reduction space 82 has been reduced in pressure, the pressure of an ambient fluid acting on the pressure reduction,housing 10, such as the air, is transmitted to the travel surface F via the main frame 4, each oscillating frame 6, connecting frame 8, and each wheel 60, owing to the difference in fluid pressure between the inside and outside of the pressure reduction space 82. In this manner, the device 2 is caused to suction-adhere to the travel surface F by the pressure of the ambient fluid. Furthermore, when, in such a state of suction-adhesion, each geared motor 62 is energized to drive each wheel 60 rotationally, the device 2 is moved, while under suction-adhesion to the travel surface F, along the travel surface F by the action of each wheel 60. In FIG. 1, rotating each wheel 60 in the same direction results in the movement of the device in the up-and-down direction, while the rotation of the right and left wheels in opposite directions to each other can make the device 2 revolve in situ.

Figure 7:
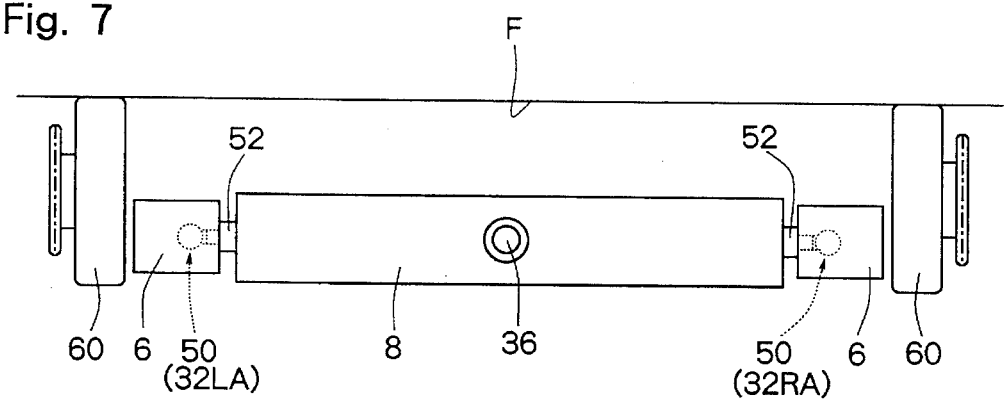
FIG. 7 is an upper side schematic view showing a state in which the device illustrated in FIG. 1 resides on a flat travel surface.
Figure 8:
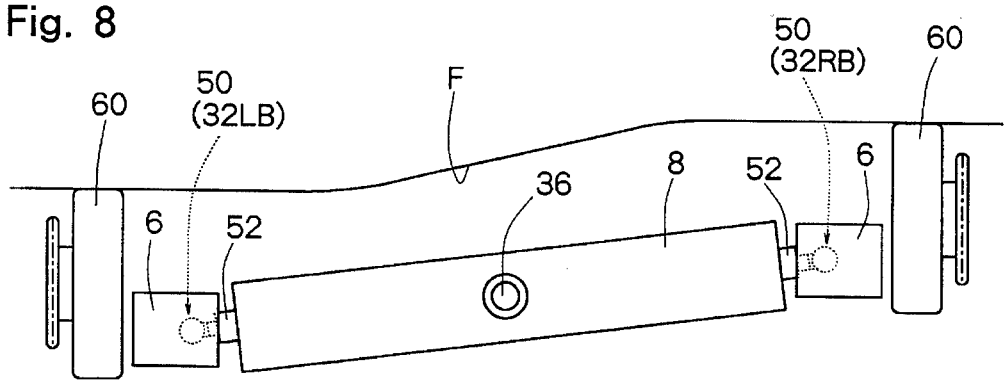
FIG. 8 is an upper side schematic view showing a state in which the device illustrated in FIG. 1 resides on a curved travel surface.
Figure 10:
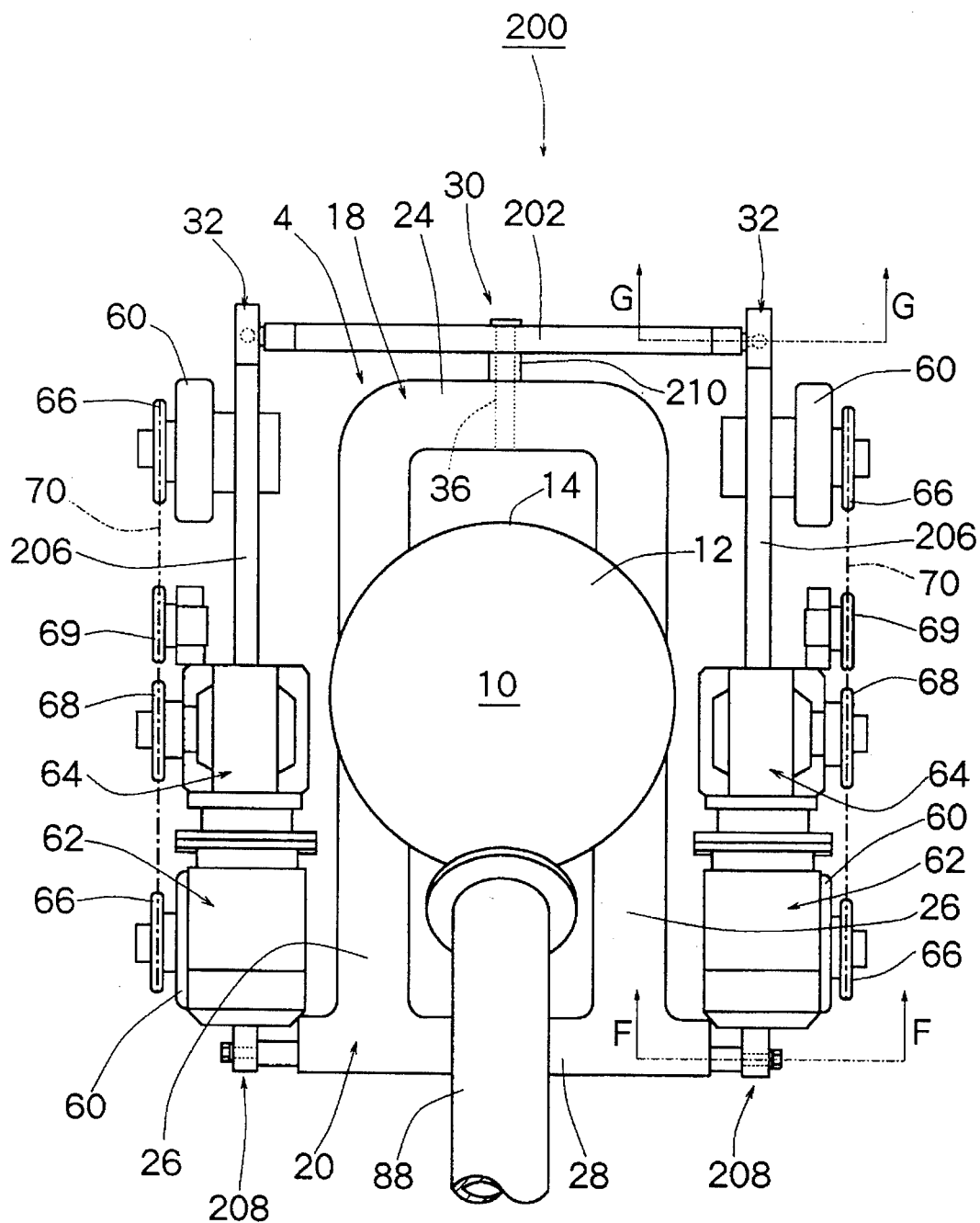
FIG. 10 is a plan view showing another embodiment of a traveling device constructed in accordance with the present invention.
Figure 11:
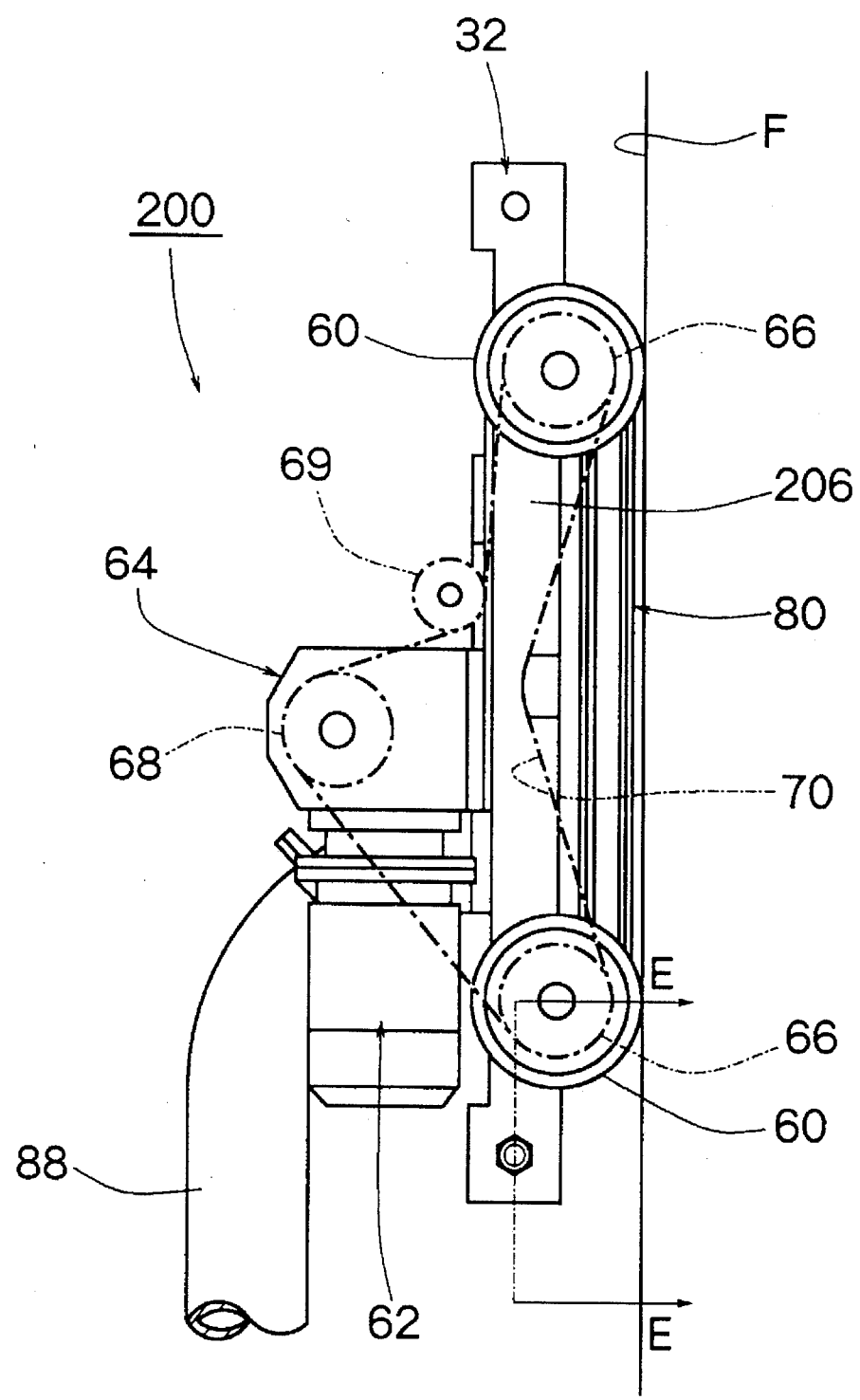
FIG. 11 is a right side view of FIG. 10.
Figure 12:
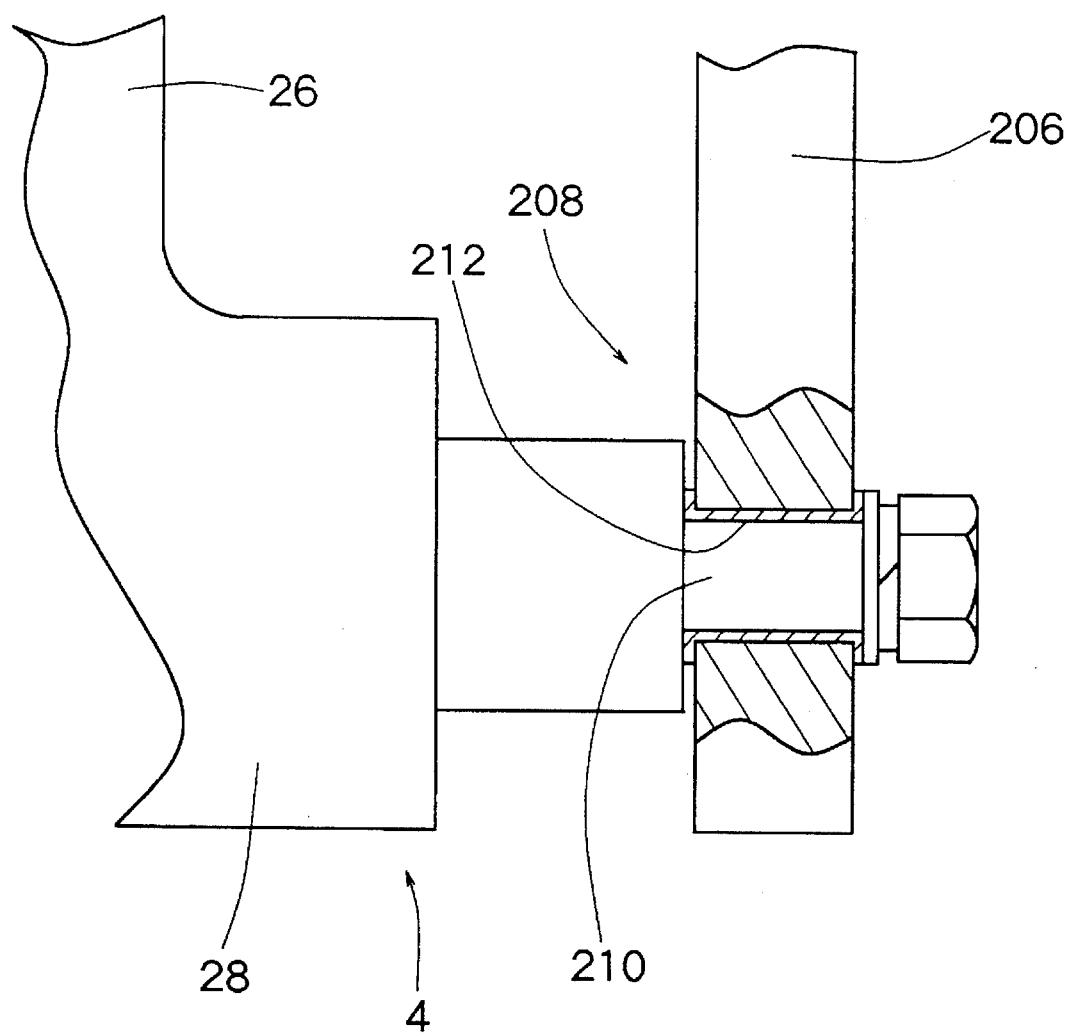
FIG. 12 is a sectional view taken on line E—E of FIG. 11.
Figure 13:
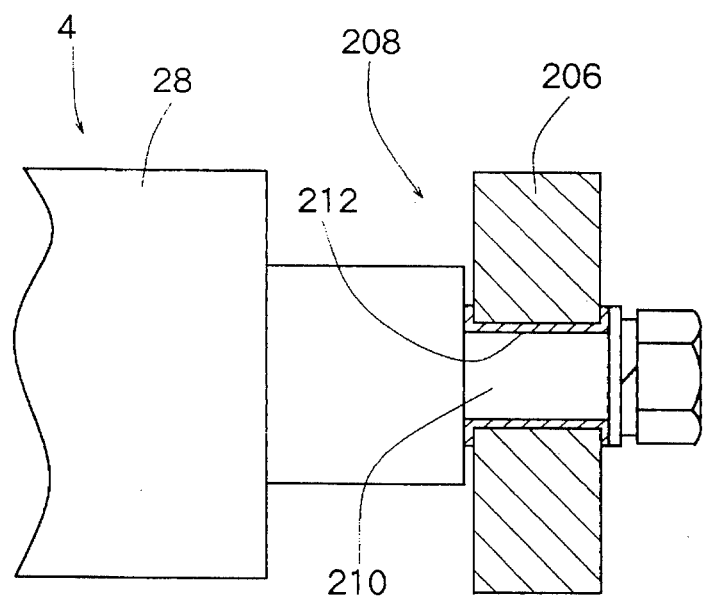
FIG. 13 is a sectional view taken on line F—F of FIG. 10.
Figure 14:
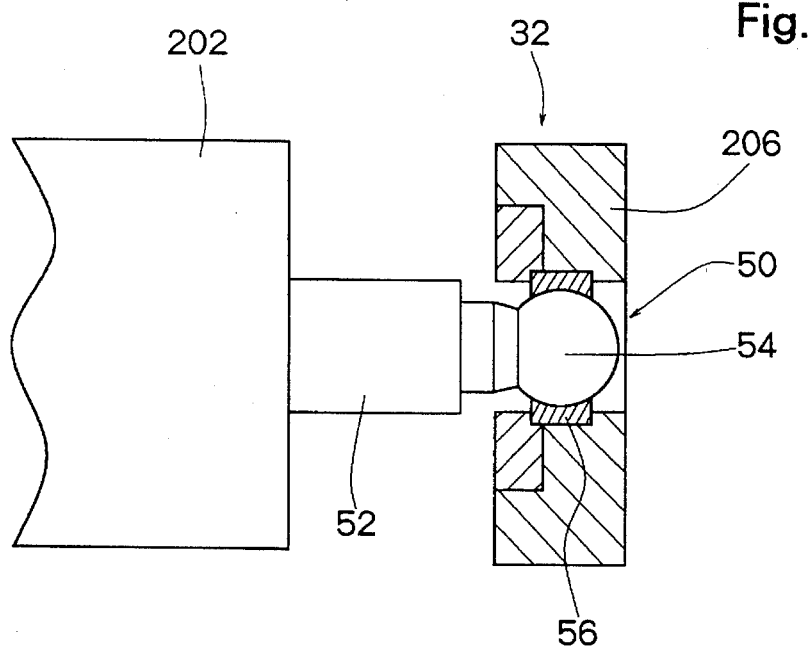
FIG. 14 is a sectional view taken on line G—G of FIG. 10.

FIGS. 7 to 9 are referred to in explaining into what shape the frame means of the traveling device 2 according to the present invention will be changed as a whole when it runs on a curved travel surface. FIG. 9 (A) to (C) are schematic representations of how the entire shape of the frame means of the device 2 changes on a curved travel surface, with FIG. 9 (A) being an upper side view of the device 2, FIG. 9 (B) being a plan view of FIG. 9 (A), and FIG. 9 (C) being a right side view of FIG. 9 (B). In FIGS. (A) to (C), the one-dot chain line and the symbol A represent a state in which the device 2 lies on a flat travel surface F. The two-dot chain line and the symbol B represent a state in which the device 2 lies on a curved travel surface F. In this state, one end portion of the right oscillating frame 6 (the upper end portion in FIG. 1) inclines toward the travel surface F, while one end portion of the left oscillating frame 6 (the upper end portion in FIG. 1) inclines away from the travel surface F. The symbol L represents the left side of the device 2 (the left side in FIG. 1), while the symbol R represents the right side of the device 2 (the right side of FIG. 1). The symbol h represents the distance, on a plane perpendicularly intersecting the travel surface F, over which one end portion and the other end portion of the connecting frame 8 have moved.

Referring to FIG. 9, one will see that in each frame illustrated, the relative angle between the main frame 4 and each oscillating frame 6 varies on a plane perpendicularly intersecting the oscillating transverse shaft 40 of the biaxially oscillating joint means 34, and the relative angle between the main frame 4 and each oscillating frame 6 also varies on a plane perpendicularly intersecting the oscillating longitudinal shaft 38. On a plane on which the oscillating transverse shaft 40 lies and which perpendicularly intersects the travel surface F, however, the relative angle between the main frame 4 and each oscillating frame 6 does not vary. The larger the relative angle between the main frame 4 and each oscillating frame 6 becomes on the plane perpendicularly intersecting the oscillating transverse shaft 40 (this angle is 0 degree on a flat travel surface), the greater the relative angle between the connecting frame 8 and the main frame 4 becomes (this angle is 0 degree on a flat travel surface). Hence, that distance, on the plane perpendicularly intersecting the oscillating longitudinal shaft 38 of the biaxially oscillating joint means 34, which exists between one end portion and the other end portion of the connecting frame 8, decreases (from WA to WB). Thus, the relative angle between the main frame 4 and each oscillating frame 6 on the plane perpendicularly intersecting the oscillating longitudinal shaft 38 (the angle is 90 degrees on a flat travel surface) becomes less than 90 degrees. At this time, that distance 1, on the plane perpendicularly intersecting the oscillating longitudinal shaft 38 of the biaxially oscillating joint means 34, which exists between the central portion of the connecting frame 8 and the oscillating transverse shaft 40 of the biaxially oscillating joint means 34, also decreases (from 1A to 1B). Hence, the central portion of the connecting frame 8 slides on the oscillating transverse shaft 36 of the monoaxially oscillating joint means 30 toward the main frame 4.

Next, a traveling device 200 constructed in accordance with another embodiment of the present invention will be described referring to FIGS. 10 to 14. The constitution of this device 200 is different from that of the above-described traveling device 2 only in terms of the frame means. Since the other constituents are substantially the same, the same portions will be indicated by the same numerals or symbols, and explanations for them will be omitted. A central portion of a connecting frame 202 and one end portion side of the main frame 4 are coupled together by the monoaxially oscillating joint means 30. Both end portions of the connecting frame 202 and one portion of each oscillating frame 206 are coupled together by the omniaxial joint means 32. The other end portion of each oscillating frame 206 is coupled to both side portions on the other end portion side of the main frame 4 by a monoaxially oscillating joint means 208. The connecting frame 202 and each oscillating frame 206 are each composed of a band-like steel plate so that they can deflect.

In the aforementioned device 2, the central portion of the connecting frame 8 is coupled to the oscillating transverse shaft 36 of the monoaxially oscillating joint means 30 so as to be free to pivot and slide along the oscillating transverse shaft 36. Whereas, in the device 200, the central portion of the connecting frame 8 is coupled to the oscillating transverse shaft 36 of the monoaxially oscillating joint means 30 so as to be free to pivot, but not to be free to slide along the oscillating transverse shaft 36. Specifically, a collar 210 is fitted and disposed on the oscillating transverse shaft 36 between the connecting frame 8 and the connecting portion 24 of the main frame 4. This collar 210 inhibits the above-mentioned slide of the connecting frame 8. Of course, unless the collar 210 is mounted, the connecting frame 8 becomes slidable along the oscillating transverse shaft 36, and it may be constructed in such a manner in some cases. Since each omniaxial joint means 32, as will be clear from FIG. 14, has substantially the same constitution as the one mounted in the device 2 (see FIG. 6), the same portions will be given the same symbols or numerals, and their explanations will be omitted.

The respective monoaxially oscillating joint means 208 have substantially the same constitution, and so one of them will be described here. By reference to FIGS. 11 to 13, the monoaxially oscillating joint means 208 has an oscillating transverse shaft 210 having an oscillating plane substantially perpendicularly intersecting the travel surface F. One end of the oscillating transverse shaft 210 is fixed to the end portion 28 of the main frame 4, and the other end portion of the oscillating frame 206 is rotatably held via an oilless bearing 212 at a front end portion of the oscillating transverse shaft 210 protruding sideways from the end portion 28. Therefore, the other end portion of the oscillating frame 206 is rotatable about the oscillating transverse shaft 40 with respect to the end portion 28 of the main frame 4.

When the entire shape of the frame means of the device 200 changes on a curved travel surface as has been explained in FIGS. 7 to 9, the relative positions of the main frame 4 and each oscillating frame 206 change freely, with the oscillating transverse shaft 210 of each monoaxially oscillating joint means 208 connecting them being the center of rotation. Also, the relative positions of the main frame 4 and the connecting frame 202 change freely, with the oscillating transverse shaft 36 of the monoaxially oscillating joint means 30 connecting them being the center of rotation. That is, the relative angles between the main frame 4 and each of the oscillating frame 206 vary on the plane perpendicularly intersecting each of the oscillating transverse shaft 210 of the monoaxially oscillating joint means 208 connecting the main frame 4 and each oscillating frame 206 together. Also on the plane parallel to the travel surface F, the relative angles between the main frame 4 and each of the oscillating frames 206 vary. In this case, oscillation-associated stress that occurs at each of the coupling sites of the respective oscillating frames 206 is absorbed by the deflection of each oscillating frame 206. Thus, the deformation of each oscillating frame 206 on the plane parallel to the travel surface F becomes possible, thereby enabling each oscillating frame 206 to oscillate. If each oscillating frame 206 is constructed so as not to deflect substantially, the above stress can be absorbed by the deflection of the mounting portion for the oscillating transverse shaft 210 on each of the monoaxially oscillating joint means 208 that connect the main frame 4 and each oscillating frame 206 together. When the relative angle of each oscillating frame 206 to the main frame 4 on the plane parallel to the travel·surface F varies, a force moving toward the main frame 4 acts on the central portion of the connecting frame 202 on the oscillating transverse shaft 36 of the monoaxially oscillating joint means 30. This force is absorbed by the deflection of the connecting frame 202. When the connecting frame 202 is constructed so as to be slidable along the oscillating transverse shaft 36, the connecting frame 202 may be adapted not to deflect substantially.

Figure 15:
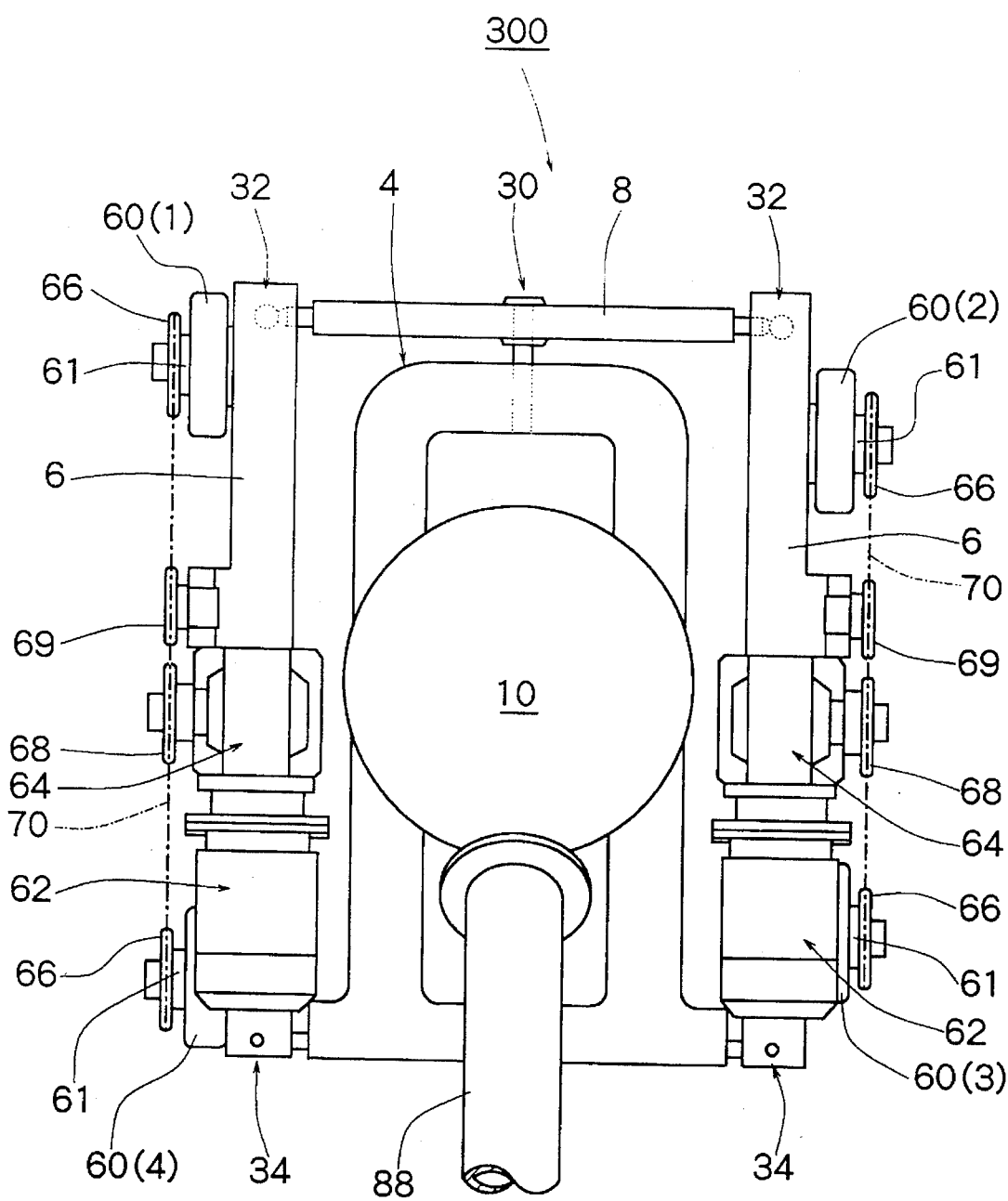
FIG. 15 is a plan view showing still another embodiment of a traveling device constructed in accordance with the present invention.
Figure 16:
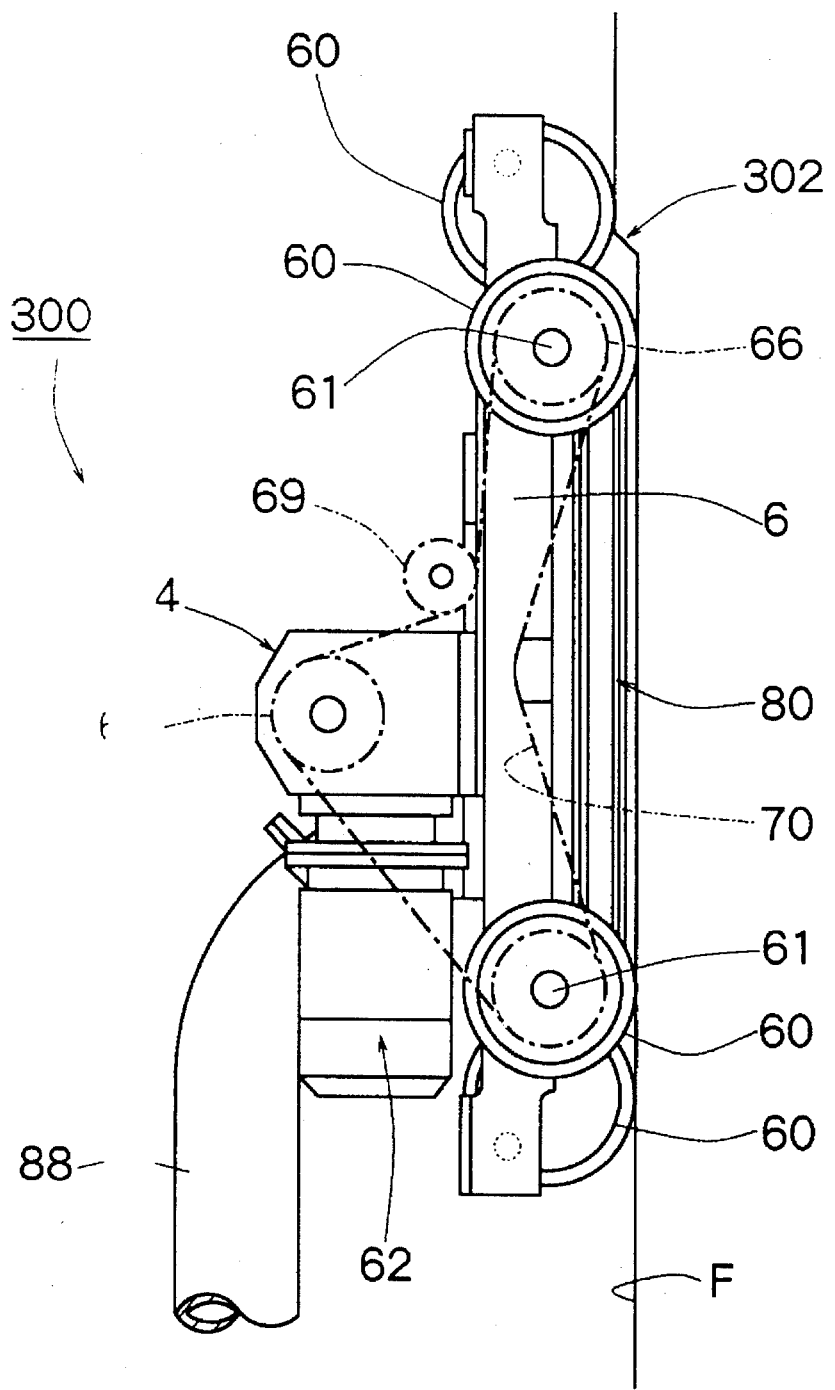
FIG. 16 is a right side view of FIG. 15.

Next, FIGS. 15 and 16 are referred to in explaining a traveling device 300 constructed in accordance with still another embodiment of the present invention. The constitution of this device 300 is different from that of the above-described traveling device 2 only in terms of the part related to the arrangement of the wheels 60 which are moving means. Since the other constituents are substantially the same, the same portions will be indicated by the same numerals or symbols, and explanations for them will be omitted. In the device 300, the rotating shafts 61 of the four wheels 60 are not arranged on the same plane orthogonal to the traveling direction of the device 300 (the up-and-down direction in FIG. 15) and perpendicularly intersecting the travel surface F, but they are arranged on different such planes. The action of the device 300 moving along the travel surface F while suction-adhering thereto is carried out in the same manner as described for the device 2. Because of the above-described arrangement of the rotating shafts 61 of the four wheels 60, when the device 300 is to move upwards while passing over a horizontally extending protrusion 302 present on a vertical travel surface F, such as a weld line, the four wheels 60 ride over the protrusion 302 one by one and move upwards. In FIG. 15, the numerals in the parentheses following the numeral 60 represent the sequence in which the wheels 60 ride over the protrusion 302. For instance, 60(1) indicates the first wheel to pass over the protrusion 302, and 60(4) shows the fourth wheel to ride over the protrusion 302. In the illustrated embodiment, the wheels 60 mounted by the two on the right and left sides of the device 300 are arranged so as to pass over the protrusion 302 in the following sequence: the left wheel, then the right wheel, then the right wheel, and finally the left wheel.

Figure 17:
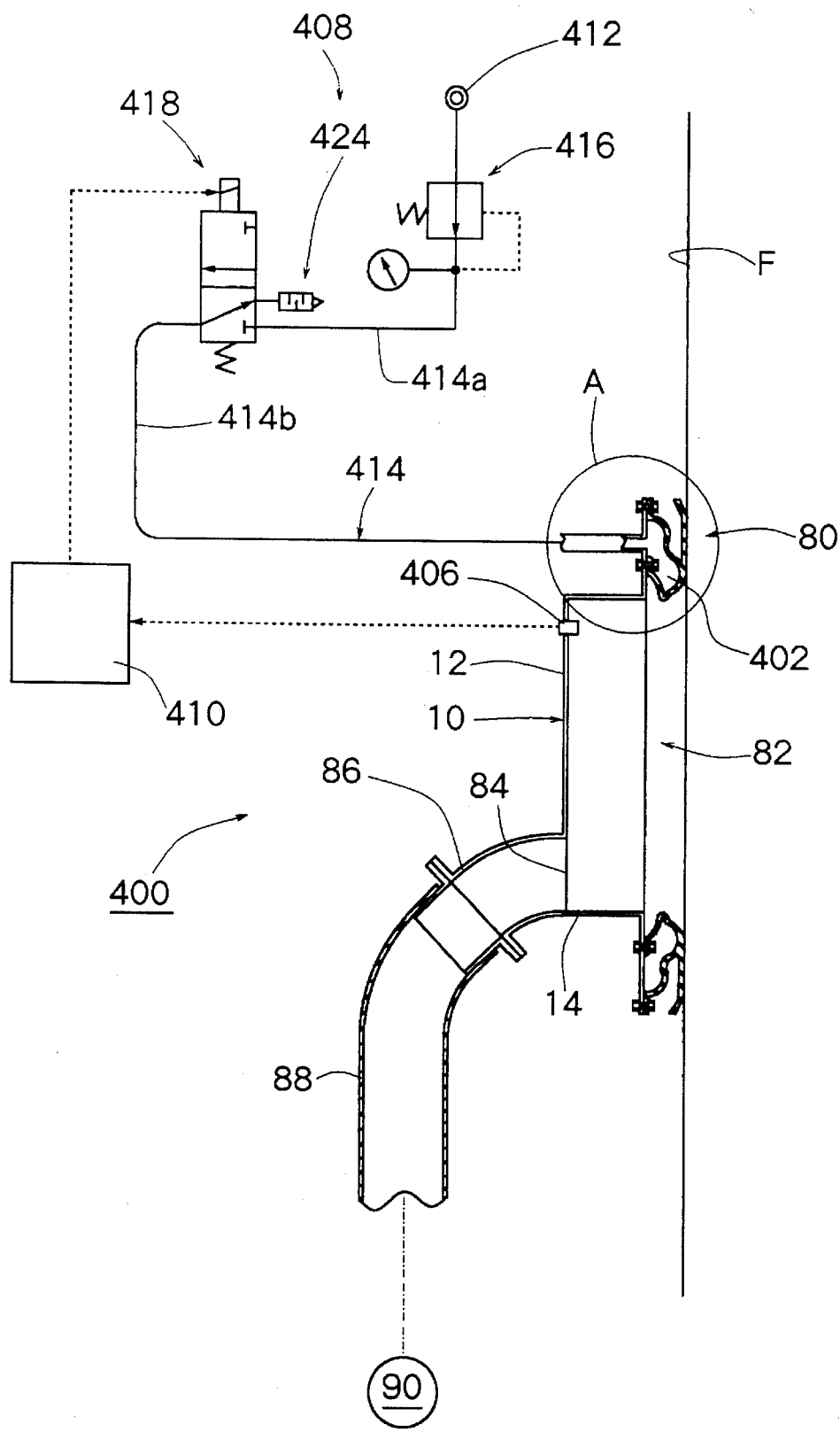
FIG. 17 is a schematic view showing a further embodiment of a traveling device constructed in accordance with the present invention.

Next, FIGS. 17 and 18 are referred to in explaining a traveling device 400 constructed in accordance with a further embodiment of the present invention. In these drawings, the same portions as in the device 2 will be indicated by the same numerals or symbols, and explanations for them will be omitted. The device 400 is provided with the same frame means and moving means (not shown) as in the device 2, although it is not limited thereto. The device 400 can move along the travel surface F, while suction-adhering thereto by the pressure of an ambient fluid acting on the pressure reduction housing 10 owing to the difference in fluid pressure between the inside and the outside of the pressure reduction space 82. As aforesaid, the reduction pressure housing 10 has the flange wall 16, i.e., an annular mounting portion, and the suction-adhering sealing means 80 has a space portion 402 toroidal in shape and opening on one end side thereof. The toroidal space portion 402 is formed of an outside connecting portion 106, an inside connecting portion 104, and a connecting portion 404 connecting their end portions on the travel surface F side. The one end side of the toroidal space portion 402 is formed of a flange portion 114 of the outside connecting portion 106 and a flange portion 110 of the inside connecting portion 104. The flange portion 114 of the suction-adhering sealing means 80 is coupled to the flange wall 16 by means of bolts 120 and nuts 122, and the flange portion 110 is coupled to the flange wall 16 by means of bolts 116 and nuts 118, whereby the suction-adhering sealing means 80 is mounted on the flange wall 16 of the pressure reduction housing 10. Thus, the space portion 402 of the suction-adhering sealing means 80 is substantially sealed by the flange wall 16. That is, the space portion 402 having one end side thereof open makes a sealed space portion in cooperation with the flange wall 16.

The device 400 has a sealing function compensating means. The sealing function compensating means has a pressure sensor 406 (constituting a pressure detecting means) for detecting the pressure inside the pressure reduction space 82, a pressure fluid feeding means 408 for feeding a pressure fluid to the space portion 402 to inflate the suction-adhering sealing means 80, and a controlling means 410 which, when the degree of vacuum of the pressure reduction space 82 has lowered to less than a predetermined degree of vacuum, actuates the pressure fluid feeding means 408 based on an input signal from the pressure sensor 406 to feed a pressure fluid to the space portion 402. The pressure fluid feeding means 408 has an air compressor 412 for generating compressed air as a pressure fluid, and a pressure reducing valve 416 and an electromagnetic opening/closing valve 418 that are disposed on an air flow path 414 connecting the air compressor 412 to the space portion 402 of the suction-adhering sealing means 80. The air flow path 414 includes an air hose 420 having an end coupled to a joint portion 422 provided on the flange wall 16 of the pressure reduction housing 10. The electromagnetic opening/closing valve 418 comprises a 3-port 2-position changeover solenoid valve. When closed for a non-operating state, the electromagnetic opening/closing valve 418 is positioned at the first position indicated in FIG. 17. While in this closed state, it shuts the air flow path 414a on the air compressor 412 side, and opens the air flow path 414b on the space portion 402 side of the suction-adhering sealing means 80 to the air via a silencer 424. When opened for an operating state where the electromagnetic opening/closing valve 418 is brought to the second position, this valve 418 opens the air flow path 414a on the air compressor 412 side, causing the air compressor 412 and the space portion 402 to communicate with each other, and closes the air flow path on the open-air side.

The controlling means 410 is composed of a microcomputer, and has a central processing means for performing operations according to controlling programs, a storage means having a ROM storing controlling programs and a RAM capable of reading and writing which stores the predetermined values for the degree of vacuum, etc., and an input-output interface. When the degree of vacuum of the pressure reduction space 82 has declined to less than a predetermined value, say, less than −100 mmHg, the pressure sensor 406 detects this, sending a signal to the controlling means 410. Based on this input signal from the pressure sensor 406, the controlling means 410 produces a controlling signal toward the electromagnetic opening/closing valve 418. The electromagnetic opening/closing valve 418 is brought from the first position to the second position to become activated. As a result, the air compressor 412 and the space portion 402 of the suction-adhering sealing means 80 are caused to communicate with each other, and compressed air reduced in pressure to a predetermined value by the pressure reducing valve 416 is fed to the space portion 402. Consequently, the suction-adhering sealing means 80 is inflated, whereby a free end portion of the suction-adhering sealing means 80, including the connecting portion 404 and the lip portion 100, is moved toward the travel surface. Then, when the degree of vacuum of the pressure reduction space 82 reaches the predetermined value, the pressure sensor 406 detects this, sending a signal to the controlling means 410. Based on this input signal from the pressure sensor 406, the controlling means 410 produces a controlling signal toward the electromagnetic opening/closing valve 418. The electromagnetic opening/closing valve 418 is switched from the second position to the first position to become inoperable. As a result, the air compressor 412 and the space portion 402 of the suction-adhering sealing means 80 are cut off from each other, and the space portion 402 is opened to the air.

In the device 400, it is also possible to use a pressure switch instead of the pressure sensor 406, use a relay instead of the controlling means 420, and constitute the electric circuit from them and the electromagnetic opening/closing valve 418. In the case of this constitution, when the degree of vacuum of the pressure reduction space 82 has lowered to less than the predetermined degree of vacuum, the pressure switch becomes ON. Thus, the relay is energized, and the relay switch is turned on. If the relay switch and the electromagnetic opening/closing valve 418 are connected in series to the power source, the electromagnetic opening/closing valve 418 is energized because of the ON-state of the relay switch, whereby it is shifted to the second position to become operable. Subsequent actions are substantially the same as in the aforementioned embodiment.

While the present invention has been described in detail hereinabove by reference to its embodiments, it should be understood that the invention is not limited to these embodiments, but various changes and modifications are possible without departing from the scope of the invention. As in the foregoing, the present invention has been described based on the embodiments of a traveling device which can suction-adhere to the travel surface by the pressure of an ambient fluid such as air or water and can move along it. However, the invention is also applied to a traveling device of the type which has no suction-adhering equipment as illustrated in the embodiments, but has working equipment such as sandblaster and can move while performing a surface treating operation (excluding the device shown in FIGS. 17 and 18). Furthermore, the technical concepts indicated in the respective embodiments of the present invention can be implemented in combinations. The embodiments of the instantly claimed device have been explained such that the device is present on the surface in the air, but the device can also be applied underwater. In this case, a water pump or a water ejector can be used as a pressure reducing means instead of the vacuum pump.

I claim:

1. A traveling device having frame means, and moving means mounted on the frame means and moving on a travel surface, the moving means comprising a plurality of wheels, or a plurality of endless tracks each including a plurality of belt pulleys, wherein the frame means includes a main frame, a pair of oscillating frames arranged on both sides of the main frame, and a connecting frame disposed on one end portion side of the main frame; a central portion of the connecting frame is coupled to the one end portion side of the main frame via monoaxially oscillating joint means; both end portions of the connecting frame are coupled to .one end portion of each of the oscillating frames via omniaxially oscillating joint means; the other end portion of each of the oscillating frames is coupled to both side portions of the other end portion of the main frame via biaxially oscillating joint means; each of the biaxially oscillating joint means has an oscillating longitudinal shaft having an oscillating plane substantially parallel to the travel surface, and an oscillating transverse shaft having an oscillating plane substantially perpendicularly intersecting the travel surface; and the monoaxially oscillating joint means has an oscillating transverse shaft having an oscillating plane substantially perpendicularly intersecting the travel surface and also substantially perpendicularly intersecting the oscillating plane of the oscillating transverse shaft of each of the biaxially oscillating joint means.

2. The traveling device of claim 1 wherein the connecting frame is slidable along the oscillating transverse shaft of the monoaxially oscillating joint means.

3. The traveling device of claim 1 wherein the wheels or endless tracks are mounted on each of the oscillating frames.

4. The traveling device of claim 1, which includes a pressure reduction housing mounted on the main frame, suction-adhering sealing means mounted on the pressure reduction housing and defining a pressure reduction space in cooperation with the pressure reduction housing and the travel surface, and pressure reducing means for discharging a fluid from the pressure reduction space to the outside, and which is caused to suction-adhere to the travel surface by the pressure of an ambient fluid acting on the pressure reduction housing owing to the difference in fluid pressure between the inside and the outside of the pressure reduction space.

5. The traveling device of claim 1 wherein the rotating shafts of the respective wheels, or the rotating shafts of the plurality of belt pulleys included in the respective endless tracks, are not arranged on the same plane orthogonal to the direction of travel of the traveling device and perpendicularly intersecting the travel surface, but are arranged on different such planes.

6. The traveling device of claim 4, which has the pressure reduction housing provided with an annular mounting portion, the suction-adhering sealing means having a space portion toroidal in shape and opened on one end side thereof, and sealing function compensating means for compensating the sealing function of the suction-adhering sealing means, and in which the space portion of the suction-adhering sealing means is substantially sealed by mounting the one end side of the suction-adhering sealing means on the mounting portion of the pressure reduction housing; and the sealing function compensating equipment has pressure detecting means for detecting the pressure inside the pressure reduction space, pressure fluid feeding means for feeding a pressure fluid to the space portion to inflate the suction-adhering sealing means, and controlling means that, when the degree of vacuum of the pressure reduction space has lowered to less than a predetermined degree of vacuum, actuates the pressure fluid feeding means based on an input signal from the pressure detecting means to feed a pressure fluid to the space portion.

7. A traveling device having frame means, and moving means mounted on the frame means and moving on a travel surface, the moving means comprising a plurality of wheels, or a plurality of endless tracks each including a plurality of belt pulleys, wherein the frame means includes a main frame, a pair of oscillating frames arranged on both sides of the main frame, and a connecting frame disposed on one end portion side of the main frame; a central portion of the connecting frame is coupled to the one end portion side of the main frame via monoaxially oscillating joint means; both end portions of the connecting frame are coupled to one end portion of each of the oscillating frames via omniaxially oscillating joint means; the other end portion of each of the oscillating frames is coupled to both side portions of the other end portion of the main frame via monoaxially oscillating joint means; the monoaxially oscillating joint means in each of the oscillating frames has an oscillating transverse shaft having an oscillating plane substantially perpendicularly intersecting the travel surface; and the monoaxially oscillating joint means in the connecting frame has an oscillating transverse shaft having an oscillating plane substantially perpendicularly intersecting the travel surface and also substantially perpendicularly intersecting the oscillating plane of the oscillating transverse shaft of the monoaxially oscillating joint means in each of the oscillating frames.

8. The traveling device of claim 7 wherein each of the oscillating frames is constructed such that the one end portion thereof can deflect toward the main frame on a plane parallel to the travel surface.

9. The traveling device of claim 7 wherein the connecting frame is slidable along the oscillating transverse shaft of the monoaxially oscillating joint means in the connecting frame.

10. The traveling device of claim 7 wherein the connecting frame is fixed so as not to be slidable along the oscillating transverse shaft of the monoaxially oscillating joint means in the connecting frame, and is constructed such that said both end portions of the connecting frame can deflect toward the main frame on a plane parallel to the travel surface.

11. A traveling device having frame means; moving means mounted on the frame means and moving on a travel surface, the moving means comprising a plurality of wheels, or a plurality of endless tracks each including a plurality of belt pulleys; a pressure reduction housing mounted on a main frame; suction-adhering sealing means mounted on the pressure reduction housing and defining a pressure reduction space in cooperation with the pressure reduction housing and the travel surface; and pressure reducing means for discharging a fluid from the pressure reduction space to the outside; the traveling device being capable of suction-adhering to the travel surface by the pressure of an ambient fluid acting on the pressure reduction housing owing to the difference in fluid pressure between the inside and the outside of the pressure reduction space, and being capable of moving along the travel surface; wherein the frame means includes the main frame, a pair of oscillating frames arranged on both sides of the main frame, and a connecting frame disposed on one end portion side of the main frame; a central portion of the connecting frame is coupled to the one end portion side of the main frame via monoaxially oscillating joint means; both end portions of the connecting frame are coupled to one end portion of each of the oscillating frames via omniaxially oscillating joint means; the other end portion of each of the oscillating frames is coupled to both side portions of the other end portion of the main frame via biaxially oscillating joint means; each of the biaxially oscillating joint means has an oscillating longitudinal shaft having an oscillating plane substantially parallel to the travel surface, and an oscillating transverse shaft having an oscillating plane substantially perpendicularly intersecting the travel surface; and the monoaxially oscillating joint means has an oscillating transverse shaft having an oscillating plane substantially perpendicularly intersecting the travel surface and also substantially perpendicularly intersecting the oscillating plane of the oscillating transverse shaft of each of the biaxially oscillating joint means.

12. A traveling device having frame means; moving means mounted on the frame means and moving on a travel surface, the moving means comprising a plurality of wheels, or a plurality of endless tracks each including a plurality of belt pulleys; a pressure reduction housing mounted on a main frame; suction-adhering sealing means mounted on the pressure reduction housing and defining a pressure reduction space in cooperation with the pressure reduction housing and the travel surface; and pressure reducing means for discharging a fluid from the pressure reduction space to the outside; the traveling device suction-adhering to the travel surface by the pressure of an ambient fluid acting on the pressure reduction housing owing to the difference in fluid pressure between the inside and the outside of the pressure reduction space, and moving along the travel surface; wherein rotating shafts of the plural wheels, or rotating shafts of the plural belt pulleys included in the respective endless tracks, are not arranged on the same plane orthogonal to the direction of travel of the traveling device and perpendicularly intersecting the travel surface, but are arranged on different such planes.

13. The traveling device of claim 12, which has the pressure reduction housing provided with an annular mounting portion, the suction-adhering sealing means having a space portion toroidal in shape and opened on one end side thereof, and sealing function compensating means for compensating the sealing function of the suction-adhering sealing means, and in which the space portion of the suction-adhering sealing means is substantially sealed by mounting the one end side of the suction-adhering sealing means on the mounting portion of the pressure reduction housing; and the sealing function compensating equipment has pressure detecting means for detecting the pressure inside the pressure reduction space, pressure fluid feeding means for feeding a pressure fluid to the space portion to inflate the suction-adhering sealing means, and controlling means that, when the degree of vacuum of the pressure reduction space has lowered to less than a predetermined degree of vacuum, actuates the pressure fluid feeding means based on an input signal from the pressure detecting means to feed a pressure fluid to the space portion.

14. A traveling device having frame means; moving means mounted on the frame means and moving on a travel surface, the moving means comprising a plurality of wheels, or a plurality of endless tracks each including a plurality of belt pulleys; a pressure reduction housing mounted a main frame; suction-adhering sealing means mounted on the pressure reduction housing and defining a pressure reduction space in cooperation with the pressure reduction housing and the travel surface; and pressure reducing means for discharging a fluid from the pressure reduction space to the outside; the traveling device suction-adhering to the travel surface by the pressure of an ambient fluid acting on the pressure reduction housing owing to the difference in fluid pressure between the inside and the outside of the pressure reduction space, and moving along the travel surface; wherein traveling device has the pressure reduction housing provided with an annular mounting portion, the suction-adhering sealing means having a space portion toroidal in shape and opened on one end side thereof, and sealing function compensating means for compensating the sealing function of the suction-adhering sealing means, the space portion of the suction-adhering sealing means is substantially sealed by mounting the one end side of the suction-adhering sealing means on the mounting portion of the pressure reduction housing, and the sealing function compensating equipment has pressure detecting means for detecting the pressure inside the pressure reduction space, pressure fluid feeding means for feeding a pressure fluid to the space portion to inflate the suction-adhering sealing means, and controlling means that, when the degree of vacuum of the pressure reduction space has lowered to less than a predetermined degree of vacuum, actuates the pressure fluid feeding means based on an input signal from the pressure detecting means to feed a pressure fluid to the space portion.

* * * * *